US012793004B2

(12) United States Patent
Rusnak et al.

(10) Patent No.: US 12,793,004 B2
(45) Date of Patent: Nov. 10, 2026

(54) PACKAGE TRACKING

(71) Applicant: Airspace Technologies, Inc., Carlsbad, CA (US)

(72) Inventors: Ryan Rusnak, Encinitas, CA (US); Swarupa Ellamaraju, Carlsbad, CA (US); Jose Castellanos, Carlsbad, CA (US)

(73) Assignee: Airspace Technologies, Inc., Carlsbad, CA (US)

( * ) Notice: Subject to any disclaimer, the term of this patent is extended or adjusted under 35 U.S.C. 154(b) by 0 days.

(21) Appl. No.: 18/372,178

(22) Filed: Sep. 25, 2023

(65) Prior Publication Data

US 2024/0249233 A1 Jul. 25, 2024

Related U.S. Application Data

(63) Continuation of application No. 17/352,600, filed on Jun. 21, 2021, now Pat. No. 11,810,051.

(51) Int. Cl.
*G06Q 10/0833* (2023.01)
*G06Q 10/083* (2024.01)

(52) U.S. Cl.
CPC ... *G06Q 10/0833* (2013.01); *G06Q 10/08355* (2013.01)

(58) Field of Classification Search
CPC ........... G06Q 10/0833; G06Q 10/0832; G06Q 10/083; G01D 9/007
See application file for complete search history.

(56) References Cited

U.S. PATENT DOCUMENTS

| | | | |
|---|---|---|---|
| 6,363,323 B1 | 3/2002 | Jones | |
| 8,566,183 B1 | 10/2013 | Bonar et al. | |
| 8,626,193 B1 | 1/2014 | Crossno et al. | |
| 9,020,536 B1 | 4/2015 | Crossno et al. | |
| 10,356,577 B1 | 7/2019 | Kugler et al. | |
| 10,625,952 B1 | 4/2020 | Luthra et al. | |
| 2003/0052786 A1 | 3/2003 | Dickinson | |
| 2010/0267375 A1* | 10/2010 | Lemmon ................ | G06F 21/74 455/418 |
| 2012/0197810 A1 | 8/2012 | Haarmann et al. | |

(Continued)

OTHER PUBLICATIONS

Sat Cargo, "Position and temperature tracking," Published by www.satcargo.com, Oct. 25, 2020, Retrieved from https://web.archive.org/web/20201025184527/https://www.satcargo.com/en/cold/temperature-position-tracking/ (Year: 2020).*

(Continued)

*Primary Examiner* — Bryan J Kirk
(74) *Attorney, Agent, or Firm* — Sterne, Kessler, Goldstein & Fox P.L.L.C.

(57) ABSTRACT

Embodiments are directed towards tracking a package with a tracking device (TD). Embodiments include obtaining a shipping itinerary for the package, receiving a carrier acceptance confirmation indicating the driver has transferred the package to the carrier; receiving a departure confirmation for the segment; receiving, after receiving the departure confirmation, a TD status message including a first location of the package as determined by the TD; and in response to receiving the TD status message after the departure confirmation, issuing a failure to board alert for the package.

20 Claims, 13 Drawing Sheets

(56) References Cited

U.S. PATENT DOCUMENTS

| | | | | |
|---|---|---|---|---|
| 2013/0147617 | A1* | 6/2013 | Boling | G06Q 10/0833 340/431 |
| 2013/0265154 | A1 | 10/2013 | Tumayan et al. | |
| 2013/0321122 | A1 | 12/2013 | Lee et al. | |
| 2014/0357307 | A1 | 12/2014 | Zwaal | |
| 2016/0171434 | A1 | 6/2016 | Ladden et al. | |
| 2016/0238406 | A1* | 8/2016 | Burtner | G06F 16/22 |
| 2016/0260059 | A1* | 9/2016 | Benjamin | G06Q 10/0833 |
| 2016/0353247 | A1 | 12/2016 | Sugaya | |
| 2018/0107967 | A1 | 4/2018 | Bulcao et al. | |
| 2019/0050806 | A1 | 2/2019 | Klein | |
| 2019/0230474 | A1 | 7/2019 | Lanes et al. | |
| 2019/0318302 | A1* | 10/2019 | Lawler, Jr. | G06Q 10/087 |
| 2020/0007540 | A1* | 1/2020 | Kawaguchi | H04W 4/38 |
| 2020/0051015 | A1* | 2/2020 | Davis | G06Q 10/08 |
| 2020/0100115 | A1 | 3/2020 | Skaaksrud | |
| 2020/0107264 | A1* | 4/2020 | Ayoub | H04W 4/80 |
| 2020/0334631 | A1 | 10/2020 | Conlon | |
| 2020/0364989 | A1 | 11/2020 | Benkreira et al. | |
| 2021/0006941 | A1 | 1/2021 | Cheney et al. | |
| 2021/0014653 | A1* | 1/2021 | Klein | G06Q 10/0833 |
| 2021/0406818 | A1 | 12/2021 | Adler et al. | |
| 2022/0405703 | A1 | 12/2022 | Rusnak et al. | |
| 2023/0006735 | A1* | 1/2023 | Harada | H04W 56/0015 |

OTHER PUBLICATIONS

International Search Report, mailed Dec. 10, 2022 for International Appl. No. PCT/IB2019/051626, 3 pages.

Written Opinion, mailed Dec. 10, 2022 for International Appl. No. PCT/IB2019/051626, 5 pages.

International Preliminary Report on Patentability, mailed Dec. 14, 2023, for International Appl. No. PCT/IB2019/051626, 1 page.

Envirotainer, "Live Monitoring: The Envirotainer online service for full real time shipment visibility," www.envirotainer.com, May 17, 2021 , Retrieved from https ://web.archive .org/web/20210517230614/ https ://www .envirotainer.com/services/live-monitoring/ (Year: 2021).

* cited by examiner

PACKAGE TRACKING

RELATED APPLICATION

This application claims priority to U.S. application Ser. No. 17/352,600, filed on Jun. 21, 2021, titled "Package Tracking," which is incorporated herein by reference in its entirety.

BACKGROUND

Packages are shipped domestically and internationally each day. It is increasingly important to track these packages at various stages of transport. This is especially true when the items being shipped have minimal tolerances for delays and schedule changes and/or when the items being shipped need to be kept in specific environmental conditions during transport to remain viable and useful to the receiver at the destination location.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are a tracking device, a tracking system, and multiple processes for monitoring shipment of a package using the tracking device and tracking system. The tracking device is attached to the package (or located inside the package) being shipped. The tracking device periodically transmits its location (e.g., as GPS coordinates) as well as environmental condition measurements (e.g., temperature, pressure, acceleration, etc.). The tracking system makes use of this transmitted data to ensure the one or more items inside the package will arrive at the destination location and be viable/useful to the receiver upon arrival.

Figure 1:
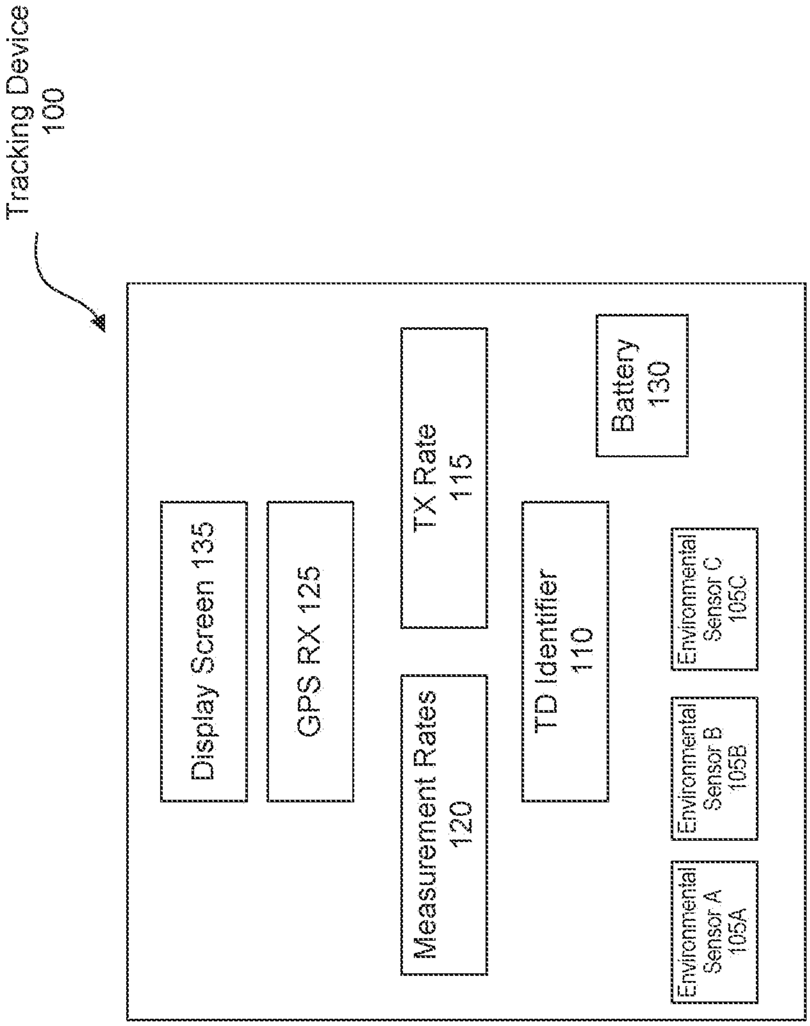
FIG. 1 shows a tracking device in accordance with one or more embodiments.

FIG. 1 shows a tracking device (TD) 100 in accordance with one or more embodiments. TD 100 may be a mobile computing device of any size or shape that is powered by battery 130. TD 100 accompanies a package before, during, and/or after shipment of the package. TD 100 may be secured to the exterior of the package. For example, if the package has a box shape, TD 100 may be secure to the top or a side of the box. Additionally or alternatively, TD 100 may be placed inside the package along with the one or more item(s) being shipped (e.g., documents, clothing, vaccines, human tissue for transplant, perishable food, airplane parts, etc.). In one or more embodiments, TD 100 may be incorporated into a label placed on the package or an item within the package.

In one or more embodiments, TD 100 stores a TD identifier 110. The TD identifier 110 may be a numeric or alphanumeric value of any length that uniquely identifies TD 100. In other words, each TD 100 stores a different TD identifier.

In one or more embodiments, TD 100 has multiple environmental sensors (e.g., environmental sensor A 105A, environmental sensor B 105B, environmental sensor C 105C). The environmental sensors 105 are configured to measure environmental conditions near and/or around TD 100 (and thus environmental conditions near and/or around the package or item being shipped). One or more of the environmental sensors 105 may be configured to measure temperature, humidity, oxygen content, atmospheric pressure, acceleration, speed, light intensity, etc. TD 100 stores a set of measurement rates 120. Each measurement rate in the set of measurement rates 120 specifies how frequently one of the environmental sensors 105 should take its respective measurement. For example, environmental sensor A 105A can be a thermometer while environmental sensor B 105B can be a barometer. One measurement rate in the set of measurement rates 120 may specify that a temperature measurement be taken twice per minute. Accordingly, environmental sensor A 105A may measure temperature twice per minute. Another measurement rate in the set of measurement rates 105 may specify that an atmospheric pressure measurement should be taken four times per hour. Accordingly, environmental sensor B 105B may measure atmospheric pressure four times per hour. These environmental measurements are exceptionally important when an item in the package is sensitive to environmental conditions (e.g., a heart being shipped for transplant needs to be kept cool to remain viable, etc.). One or more of the measurement rates in the set of measurement rates 120 may be 0, effectively turning off or not using the corresponding environmental sensor(s). Measurement rates 120 may be modified at any time to increase or decrease the sample rate of a respective environmental sensor.

Further, TD 100 includes a global positioning system receiver (GPS RX) 125 for use by TD 100 to determine its location at any time. Additionally or alternatively, TD 100 may be configured to determine its location using other satellite navigation systems (e.g., Galileo, BDS, GLONASS, etc.) or by using another means. Further, TD 100 may include additional components (not shown) that enable TD 100 to determine its location using other methods including WiFi positioning and/or cell tower triangulation.

In one or more embodiments, TD 100 is configured to communicate using multiple long-range and/or short-range wireless technologies including cellular networks, WiFi, Bluetooth®, infrared, etc. In one or embodiments, TD 100 is configured to wirelessly transmit its location, one or more environmental condition measurements, the battery charge and/or remaining life of battery 130, etc. Each transmission may include a timestamp. TD 100 stores a transmission rate 115. Transmission rate 115 specifies how often the location of TD 100, the environmental condition measurements, the battery charge and/or the remaining life of battery 130 should be transmitted. Transmission rate 115 may be modified at any time.

Similarly, TD 100 is configured to receive TD commands wirelessly. These TD commands may modify one or more of the measurement rates 120. These TD commands may also modify transmission rate 115 and specify the type of wireless technology (e.g., cellular, WiFi, Bluetooth®, etc.) that should be used by TD 100 to transmit.

In one or more embodiments, in order to comply with aviation laws and regulations, TD 100 does not transmit while TD 100 (or the package associated with TD 100) is in flight. For example, TD 100 may cease transmitting when closure of the aircraft's cargo door is detected, when movement of the aircraft is detected, when the aircraft is above a threshold altitude, or when take-off of the aircraft is detected, etc. TD 100 may resume transmitting when the aircraft's door is opened, when the aircraft lands, when the aircraft falls below the threshold altitude, etc. This is further discussed below in reference to FIG. 3.

In one or more embodiments, TD 100 includes a display screen 135. Display screen 135 may constantly display TD identifier 110. Alternatively, display screen 135 may display a set of values one at a time, effectively cycling through the set of values. The set of values may include TD identifier 110, one or more of the latest environmental condition measurements, the latest location, the remaining life of battery 130, etc. The display screen 135 may also function as a label for the package (or an item in the package) and thus can display additional information such as a description, the sender, the receiver, expected arrival date, a sales price, etc.

Figure 2:
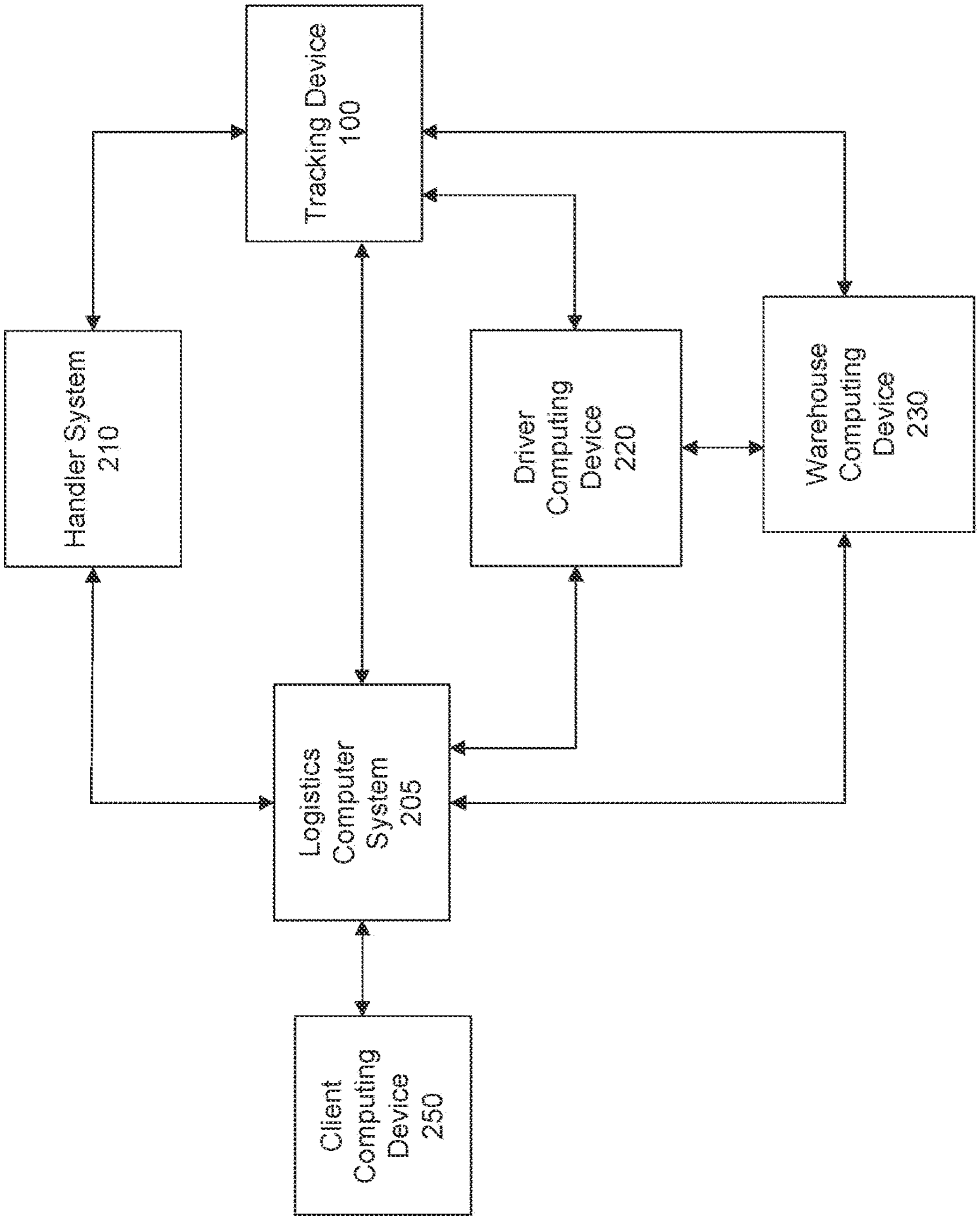
FIG. 2 shows a tracking system in accordance with one or more embodiments.

FIG. 2 shows a tracking system in accordance with one or more embodiments. As shown in FIG. 2, the tracking system has multiple components including TD 100, logistics computer system 205, handler system 210, driver computing device 220, warehouse computing device 230, and client computing device 250. Each of logistics computer system 205, handler system 210, client computing device 250, driver computing device 220, and warehouse computing device 230 may correspond to a server, a mainframe, a personal computer (PC), a kiosk, a mobile computing device (e.g., laptop PC, tablet PC, smartphone, personal digital assistant (PDA), etc.), etc. These components may exchange data over one or more networks having wired and/or wireless segments using, for example, messages, notifications, alerts, API calls, webhooks, data pushes/pulls, subscription requests, etc.

In one or more embodiments, logistics computer system 205 is operated by the entity responsible for transporting the package associated with TD 100 from a pickup location (e.g., a home, a business, an academic institution, an indoor or outdoor storage facility, a medical facility, a laboratory, etc.) to a destination location (e.g., a home, a business, an academic institution, an indoor or outdoor storage facility, a medical facility, a laboratory, etc.). Accordingly, logistics computer system 205 may be configured to generate a shipping itinerary for the package with one or more ground, water, rail, and/or flight segments, monitor the progress of the package in transit from the pickup location to the destination location, and issue alerts when there is a deviation from the shipping itinerary (discussed below).

In one or more embodiments, logistics computer system 205 is configured to receive TD status messages. Each TD status message may include one or more of TD identifier 110, a location of TD 100, one or more environmental condition measurements taken by TD 100, the battery charge and/or remaining battery life of battery 130, a timestamp associated with one or more of these values, etc. A TD status message may be generated by TD 100 and sent to logistics computer system 205. Additionally or alternatively, a TD status message may be generated by another device (e.g., handler system 210, driver computing device 220, warehouse computing device 230) and sent to the logistics computer system 205. In such scenarios, the TD status message may be encapsulated in another message usually sent by the handler system 210, driver computing device 220, and/or warehouse computing device 230. Moreover, the handler system 210, driver computing device 220, and/or warehouse computing device 230 may generate the TD status message based on the location, environmental condition measurements, and/or battery charge, etc., received from TD 100. Additionally or alternatively, the handler system 210, driver computing device 220, and/or warehouse computing device 230 may receive the TD status message from TD 100 and relay it, with or without additional formatting, to logistics computer system 205.

Although FIG. 2 only shows a single TD 100, in other embodiments, logistics computer system 205 may be managing the shipment of multiple packages, with each package associated with a different TD 100.

In one or more embodiments, the client computing device 250 is operated by the sender of the package, the receiver of the package, and/or the party paying for shipping the package. Although FIG. 2 only shows a single client computing device 250, in other embodiments, there may be multiple client computing devices, one for each of the sender, receiver, payer, etc.

Further, handler system 210 may be operated by a third-party (e.g., manufacturer) associated with TD 100. Although FIG. 2 shows handler system 210 interacting with one TD 100, in other embodiments, handler system 210 interacts with multiple TDs associated with multiple packages.

Further, driver computing device 220 is operated by a driver of a vehicle responsible for transporting the package during at least one ground segment of the shipping itinerary. Driver computing device 220 may be secured to the vehicle (e.g., embedded in the dashboard) or the driver computing device 220 may be portable and carried by the driver. Like TD 100, driver computing device 220 may include a GPS receiver or any other component that enables driver computing device 220 to determine its location (e.g., using WiFi positioning and/or cell tower triangulation) and thus the location of the driver. Driver computing device 220 may periodically transmit a driver message including the location of driver computing device 220, an identifier of the driver operating the driver computing device 220, etc. to logistics computer system 205. Although FIG. 2 shows only a single driver computing device 220, the shipping itinerary may have multiple ground segments, and each ground segment may have a different driver with a driver computing device.

Further still, warehouse computing device 230 may be operated by an entity that manages an indoor or outdoor storage facility (e.g., warehouse, storage field, etc.). The package may be stored in a storage facility at any time before, during, and/or after shipping the package. For example, the pickup location may be a warehouse and the destination location may be a storage field. Although FIG. 2 shows only a single warehouse computing device 230, in other embodiments, each storage facility has its own warehouse computing device.

FIG. 2 may also include an auxiliary computing device (not shown). The auxiliary computing device may correspond to a server, a mainframe, a personal computer (PC), a kiosk, a mobile computing device (e.g., laptop PC, tablet PC, smartphone, personal digital assistant (PDA), etc.). The auxiliary computing device may be owned and/or operated by anyone including third-party individuals and private citizens not associated with the package. In one or more embodiments, the auxiliary computing device may correspond to driver computing device 220 or warehouse computing device 230. When the auxiliary computing device is near (e.g., within some threshold distance) of TD 100, the auxiliary computing device and TD 100 may wirelessly communicate (e.g., via Bluetooth, ultra-wideband, etc.). TD 100 may transmit its location, one or more environmental condition measurements, TD identifier, the battery charge and/or remaining life of battery, etc. to the auxiliary computing device. The auxiliary computing device may then transmit this data to one or more of logistic computer system 205, handler system 210, driver computing device 220, warehouse computing device 230, etc. This scenario is useful when TD 100 does not have a cellular or WiFi connection, but the auxiliary computing device does have a cellular or WiFi or even wired network (e.g., internet) connection. Moreover, if TD 100 is unable to determine its location and thus TD 100 does not transmit its location to the auxiliary computing device, the auxiliary computing device may transmit its own location (e.g., to logistic computer system 205, to handler system 210, etc.) as an approximation for the location of TD 100. The auxiliary computing device may determine its own location by any means including GPS, WiFi positioning, cell tower triangulation, etc.

Figure 3:
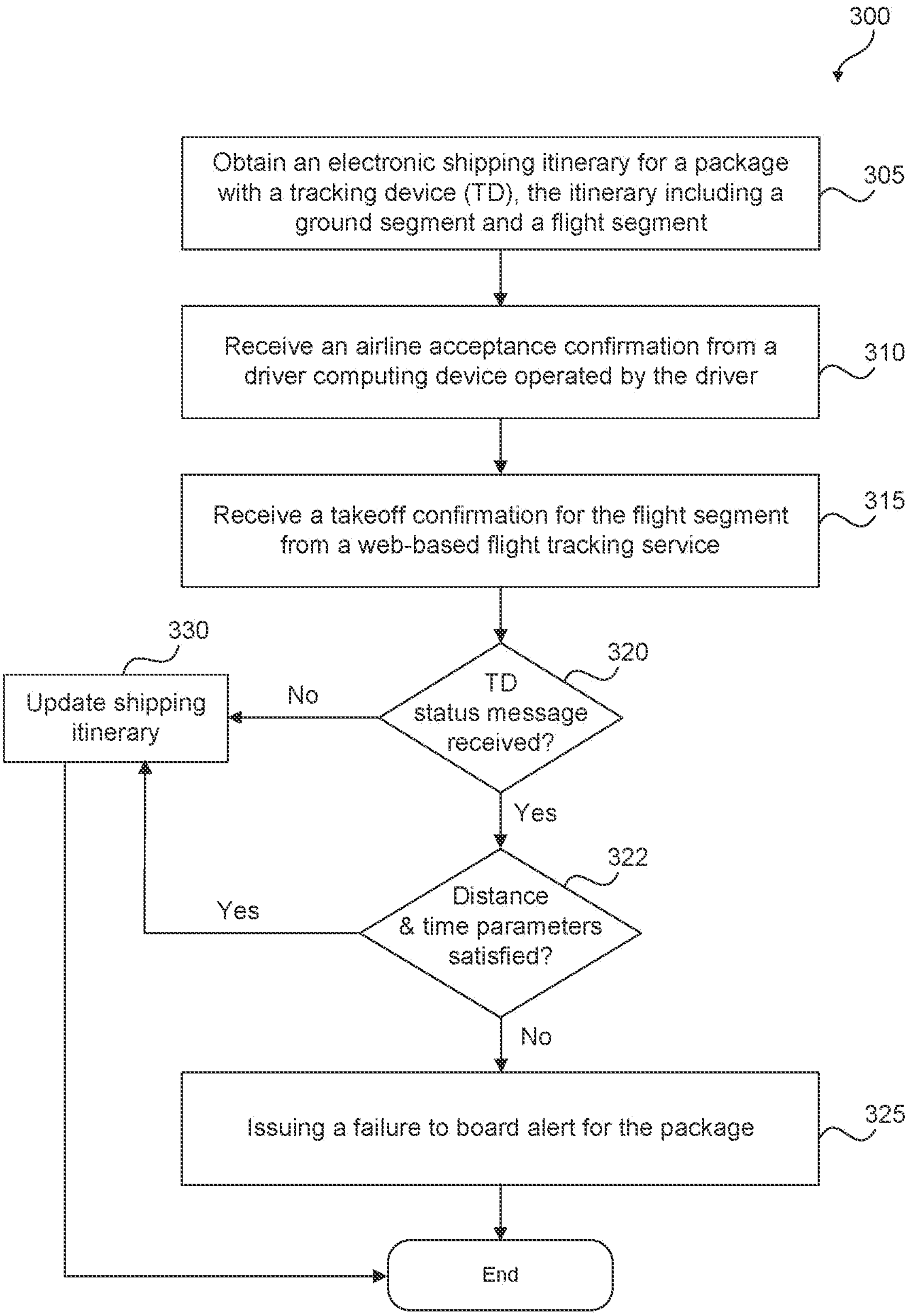
FIG. 3 shows a flowchart for a failure to board scenario associated with a package in accordance with one or more embodiments.

FIG. 3 shows a flowchart 300 for a failure to board scenario associated with a package in accordance with one or more embodiments. The steps in FIG. 3 may be executed by one or more of the components discussed above in reference to FIG. 2 (e.g., TD 100, logistics computer system 205, driver computing device 220, etc.). One or more of the steps shown in FIG. 3 may be omitted, repeated, and/or performed in a different order than the order shown in FIG. 3. Further, the steps shown in FIG. 3 may be inserted into or combined with any other process mentioned in this disclosure. Accordingly, the scope of the invention should not be considered limited to the specific arrangement of steps shown in FIG. 3.

In one or more embodiments, part of the flowchart in FIG. 3 describes a scenario where a package being shipped is transitioning from a ground segment to a flight segment of the shipping itinerary. For example, a driver is driving the package to an airport so that the package may be placed on a flight. TD 100 is secured to the package or inside the package.

In step 305, an electronic shipping itinerary for the package is obtained. Step 305 may be performed by logistics computer system 205. Logistics computer system 205 may generate the electronic shipping itinerary or retrieve the electronic shipping itinerary from a database or other electronic storage. The electronic shipping itinerary may include one or more segments for transporting the package from a pickup location to a destination location. Different segments may correspond to different modes of transportation (e.g., truck, trains, airplanes, ships, etc.). Further, the shipping itinerary may specify a specific route for each ground segment (e.g., specific roads, highways, etc.); a flight number, an airline, and flight path for each flight segment; a vessel name and a specific sea route for each water segment, etc.

In one or more embodiments, the electronic shipping itinerary includes one or more intermediate locations. An intermediate location is where one segment ends and the next segment begins. For example, an intermediate location may be an airport. A driver drives the package to the airport (ground segment), and the package is placed on a flight (flight segment).

In one or more embodiments, the shipping itinerary includes various time points. Time points may be a location anywhere along a segment (e.g., start of segment, end of segment, middle of segment, etc.) and there may be multiple time points for each segment. Each time point is the expected time the package will reach the corresponding point in the shipping itinerary.

In one or more embodiments, the shipping itinerary includes environmental condition requirements for each segment. For example, it may be necessary that the package (or the one or more items in the package) be kept between −20° C. and −5° C. during the ground segments. As another example, it may necessary that the package (or the one or more items in the package) be kept between 8 psi and 12 psi during flight segments. As yet another example, it may be necessary that the package (or the one or more items in the package) be surrounded by air that is at least 25% oxygen for all segments, etc. Any size of range may be specified for any environmental condition. The requirements may correspond to environmental conditions that can be measured by one or more of environmental sensors 105 of TD 100.

In one or more embodiments, once TD 100 is secured to the package or inserted inside the package, the shipping itinerary (or one or more records associated with the shipping itinerary) may be updated to include TD identifier 110. As a result, TD 100 becomes associated with the package.

As discussed above, an electronic shipping itinerary may have multiple segments including a ground segment followed by a flight segment. In step 310, at the end of the ground segment or at the start of the flight segment, an airline acceptance confirmation is received by logistics computer system 205. After delivering the package (with TD 100 secured to the package or inside the package), the driver may operate the driver computing device 220 to generate and transmit the airline acceptance confirmation to logistics computer system 205. This indicates to logistics computer system 205 that the driver has allegedly transferred possession of the package to the airline for the upcoming flight segment of the shipping itinerary. The airline acceptance confirmation may include TD identifier 110 in order for the logistics computer system 205 to identify the package corresponding to the airline acceptance confirmation. The shipping itinerary (or one or more records associated with the shipping itinerary) may be updated to include the airline acceptance confirmation or to indicate that the airline acceptance confirmation has been received.

In step 315, a takeoff confirmation for the flight segment is received by logistics computer system 205. The takeoff confirmation indicates to logistics computer system 205 that the aircraft associated with the flight segment has departed.

The takeoff confirmation may include the flight number, the destination, the estimated flight time, etc. The shipping itinerary (or one or more records associated with the shipping itinerary) may be updated to include the takeoff confirmation or to indicate the takeoff confirmation has been received. The takeoff confirmation may be issued (e.g., pushed) by a web-based flight tracking service. For example, logistics computer system 205 may transmit, in advance, information regarding the flight segment(s) (e.g., flight dates, flight numbers, etc.) in the shipping itinerary to the web-based flight tracking service, and then the web-based flight tracking service may issue takeoff confirmations to the logistics computer system 205 when any of the flights of interest have departed.

In step 320, logistics computer system 205 determines whether a TD status message is received. As discussed above, a TD status message is a message received by the logistics computer system 205 with data (e.g., location, environmental condition measurements, etc.) generated by TD 100. As also discussed above, in order to comply with aviation laws and regulations, TD 100 might not transmit while TD 100 (or the package associated with TD 100) is in flight, TD 100 might not transmit above a threshold altitude, etc. Accordingly, if a TD status message is received after the takeoff confirmation is received, this possibly indicates the package linked to TD 100 is not on the flight. In other words, the package might have been left behind. When it is determined that a TD status message has been received after the takeoff confirmation, the process proceeds to step 322. When it is determined that a TD status message has not been received within a time window (e.g., 15 mins, 22 mins, etc.) following the takeoff confirmation, the process proceeds to step 330.

As discussed above, the TD status message may include a location of TD 100 and a timestamp. Accordingly, the distance of TD 100 from the airport at the time specified by the timestamp may be calculated by logistics computer system 205. In step 322, logistics computer system 205 determines whether the combination of the calculated distance and time satisfy a set of distance and time parameters. For example, the distance and time parameters may require TD 100 to be at least X miles (e.g., 5 miles) away from the airport within Y minutes (e.g., 6 minutes) following the takeoff confirmation. If the set of distance and time parameters are satisfied, this indicates TD 100 is on the aircraft, and the process may proceed to 330. Even though TD 100 is on the flying aircraft, TD 100 may still be transmitting because, for example, the aircraft has not yet exceeded an altitude threshold. If the set of distance and time parameters are not satisfied, this indicates that the package is not on the flight, and the process proceeds to step 325.

In step 325, the logistics computer system 205 issues a failure to board alert for the package. The logistics computer system 205 may display various GUIs to one or more operators with status information regarding the one or more packages being transported. The failure to board alert may be a new dialog box that is displayed on top of the one or more of the GUIs and includes a message explaining what has triggered the alert. Additionally or alternatively, the failure to board alert may be a graphical change to the displayed status information for the package. For example, the color of the status information for the package may change from green to red, the size of the status information for the package may be increased on the screen, and/or the position of the status information for the package may be moved to the top of the screen or another prominent location.

This alert may also cause the logistics computer system 205 and/or its operators to search for alternative flights and/or alternative segments to transport the package to the final destination. The logistics computer system 205 may update the electronic shipping itinerary with the alternate flights and/or alternative segments. This alert may also cause logistics computer system 205 to transmit a message to the driver (e.g., driver computing device 220) to return to the airport and retrieve the package.

In step 330, the shipping itinerary (or one or more records associated with the shipping itinerary) may be updated to indicate the package is on the flight.

Although FIG. 3 focuses on the driver transferring the package to an airline for transport, the process depicted in FIG. 3 may be extended to other carriers including a railway company, a marine shipping company, or even another trucking company. In such embodiments, instead of an airline acceptance confirmation (step 310), it may be a carrier acceptance confirmation that is received from the driver computing device indicating that the driver has allegedly transferred the package to the carrier for the next segment. Further, instead of a takeoff confirmation from a web-based flight tracking service (step 315), it may be a departure confirmation for the segment that is received. The departure confirmation may be received from a web-based carrier tracking service that reports the departure of trains from rail yards or stations, boats/ships from docks or piers, trucks from bays or parking lots, etc. Further, instead of TD 100 deliberately ceasing transmission due to aviation laws and regulations, it might be determined that the train, boat/ship, truck transporting TD 100 will be crossing a region with no or poor wireless/cellular service. Accordingly, no TD status messages are expected to be received during this time window or distance range. If a TD status message is received, this may be an indication that the package is not on the train, boat/ship, or truck, and a failure to board alert may be issued (step 325).

Figure 4:
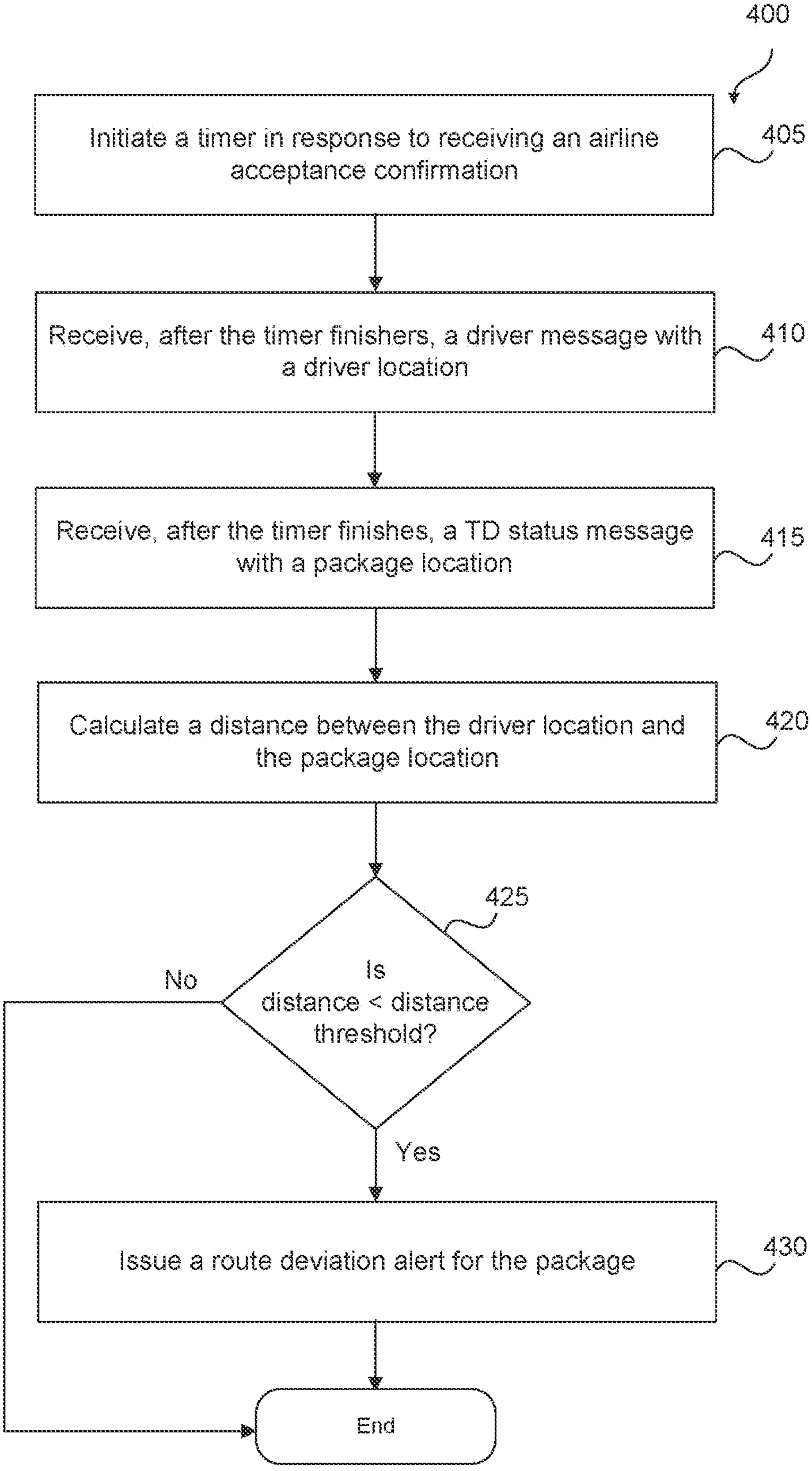
FIG. 4 shows a flowchart for a failure to drop-off scenario associated with a package in accordance with one or more embodiments.

FIG. 4 shows a flowchart 400 for a failure to drop-off scenario associated with a package in accordance with one or more embodiments. The steps in FIG. 4 may be executed by one or more of the components discussed above in reference to FIG. 2 (e.g., TD 100, logistics computer system 205, driver computing device 220, etc.). One or more of the steps shown in FIG. 4 may be omitted, repeated, and/or performed in a different order than the order shown in FIG. 4. Further, the steps shown in FIG. 4 may be inserted into or combined with any other process mentioned in this disclosure. Accordingly, the scope of the invention should not be considered limited to the specific arrangement of steps shown in FIG. 4.

In one or more embodiments, part of the flowchart in FIG. 4 describes a scenario where a package being shipped is transitioning from a ground segment to a flight segment. For example, a driver is driving the package to an airport so that the package may be placed on a flight. TD 100 is secured to the package or inside the package.

In step 405, a timer is initiated in response to receiving an airline acceptance confirmation. The timer may be initiated by logistics computer system 205. The timer may be for 5 minutes, 8 minutes, 15 minutes, etc. As discussed above, the airline acceptance confirmation may be received from driver computing device 220 and indicates that the driver of the ground segment has allegedly transferred possession of the package to the airline for the flight segment.

In step 410, a driver message is received after the timer has finished. The driver message is received by logistics computer system 205. Any driver messages received before the timer has finished may be ignored or discarded. The driver message includes a location of the driver computing device 220 and thus the location of the driver and the driver's vehicle. The location in the driver message may be specified as Cartesian coordinates, latitude and longitude, etc.

In step 415, a TD status message is received after the timer has finished. The TD status message is received by logistics computer system 205. Any TD status messages received before the timer has finished may be ignored or discarded. The TD status message includes a location of TD 100 and thus a location of the package linked to TD 100. The location of the package may be specified as Cartesian coordinates, latitude and longitude, etc.

In step 420, a distance is calculated between the location of the driver (as extracted from the driver message) and the location of the package (as extracted from the TD status message). Those skilled in the art, having the benefit of this disclosure, will appreciate that immediately after the driver allegedly transfers the package to the airline, the driver's location will still be close to the package's location. However, once the timer finishes, the distance between the driver's location and the package's location should have increased significantly (e.g., the driver is driving away from the airport).

In step 425, the distance is compared to a distance threshold. This comparison may be performed by logistics computer system 205. If the distance is less than the distance threshold, this indicates that the package was never transferred from the driver to the airline. In other words, because the driver's location and the package's location are still close, this indicates that the driver is still in possession of the package (e.g., the package is still in the driver's vehicle) and the airline acceptance confirmation (from Step 405) is erroneous. This might occur, for example, if the driver is in possession of many packages but delivered the wrong package to the airline (e.g., two similar packages were accidently switched).

When it is determined that the distance is less than the distance threshold, the process proceeds to step 430, and a route deviation alert is issued (e.g., displayed) for the package. The route deviation alert may be issued by logistics computer system 205. The logistics computer system 205 may display various GUIs to one or more operators with status information regarding the one or more packages being transported. The route deviation alert may be a new dialog box that is displayed on top of the one or more of the GUIs and includes a message explaining what has triggered the alert. Additionally or alternatively, the route deviation alert may be a graphical change to the displayed status information for the package. For example, the color of the status information for the package may change from green to red, the size of the status information for the package may be increased on the screen, and/or the position of the status information for the package may be moved to the top of the screen or another prominent location. The logistics computer system 205 and/or one of its operations may transmit a message to driver computing device 220 instructing the driver to return to the airport and transfer the correct package to the airline.

Although FIG. 4 focuses on a driver transferring a package to an airline, the process depicted in FIG. 4 may be extended to the driver transferring a package to any other carrier (e.g., railway, marine shipping company, another trucking company, etc.).

Figure 5:
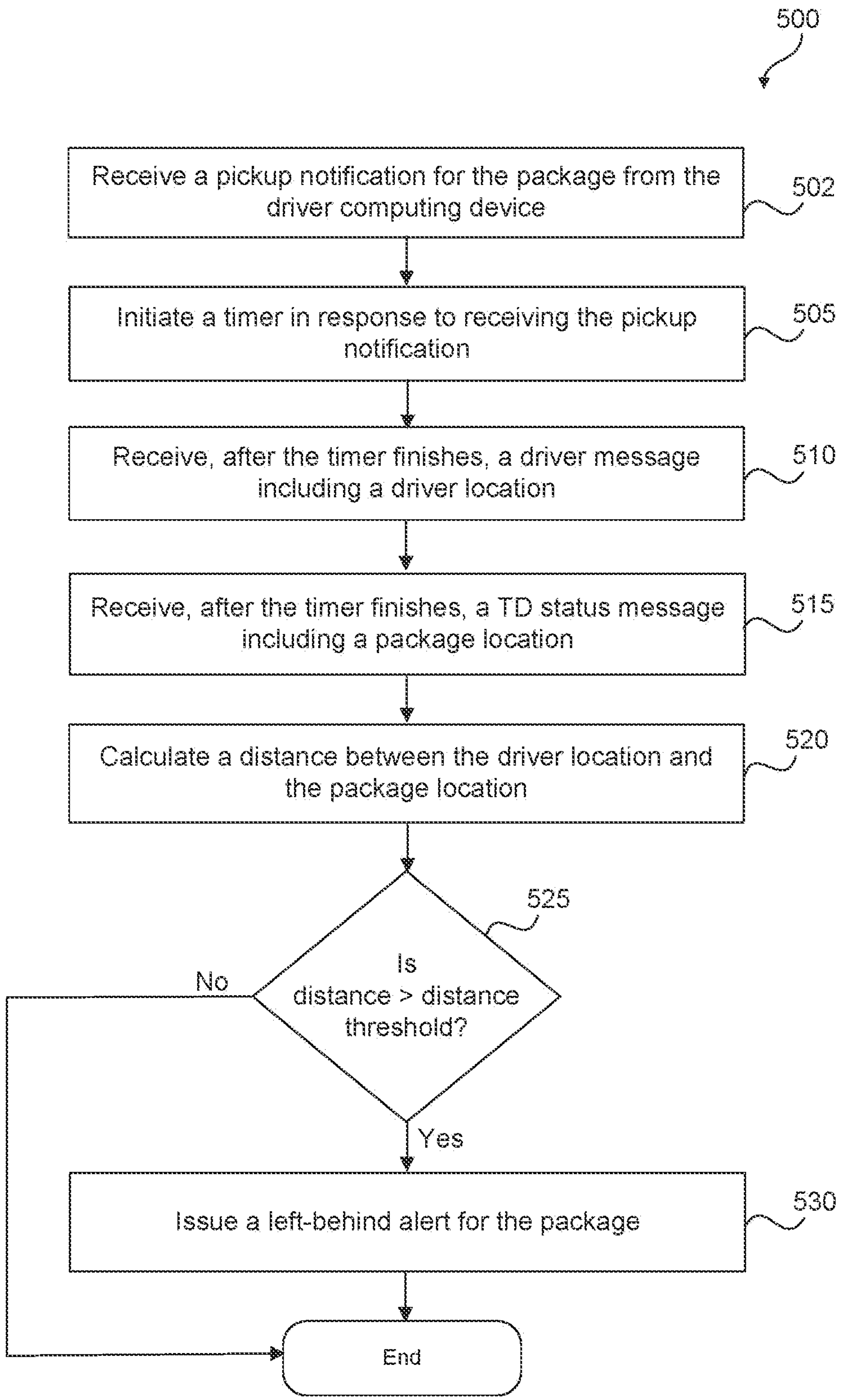
FIG. 5 shows a flowchart for a left-behind scenario associated with a package in accordance with one or more embodiments.

FIG. 5 shows a flowchart 500 for a left-behind scenario associated with a package in accordance with one or more embodiments. The steps in FIG. 5 may be executed by one or more of the components discussed above in reference to FIG. 2 (e.g., TD 100, logistics computer system 205, driver computing device 220, etc.). One or more of the steps shown in FIG. 5 may be omitted, repeated, and/or performed in a different order than the order shown in FIG. 5. Further, the steps shown in FIG. 5 may be inserted into or combined with any other process mentioned in this disclosure. Accordingly, the scope of the invention should not be considered limited to the specific arrangement of steps shown in FIG. 5.

In one or more embodiments, part of the flowchart in FIG. 5 describes a scenario where a package is being picked up by a driver for a ground segment of the shipping itinerary. The package may be picked up from the pickup location (e.g., sender's location). Alternatively, the package may be picked up from an intermediate location (e.g., airport, railyard, dock/pier, etc.) corresponding to the end of the previous segment (e.g., flight) and the start of this ground segment. For example, once a flight with the package lands, a driver may pick up the package at the airport and drive it to the destination location or another intermediate point. TD 100 is secured to the package or inside the package.

In step 502, a pickup notification is received for the package. The pickup notification may be received by the logistics computer system 205. The pickup notification may be generated by driver computing device 220. After the driver picks up the package (e.g., from the pickup location or an intermediate location), the driver may operate the driver computing device 220 to transmit the pickup notification. This indicates to logistics computer system 205 that the driver is now allegedly in possession of the package. The pickup notification may include TD identifier 110 in order for the logistics computer system 205 to identify the package corresponding to the pickup notification. The shipping itinerary (or one or more records associated with the shipping itinerary) may be updated to include the pickup notification or to indicate that the pickup notification has been received.

In step 505, a timer is initiated in response to receiving the pickup notification. The timer may be initiated by logistics computer system 205. The timer may be for 5 minutes, 8 minutes, 15 minutes, etc.

In step 510, a driver message is received after the timer has finished. The driver message is received by logistics computer system 205. Any driver messages received before the timer has finished may be ignored or discarded. The driver message includes a location of the driver computing device 220 and thus the location of the driver and the driver's vehicle. The location in the driver message may be specified as Cartesian coordinates, latitude and longitude, etc.

In step 515, a TD status message is received after the timer has finished. The TD status message is received by logistics computer system 205. Any TD status messages received before the timer has finished may be ignored or discarded. The TD status message includes a location of TD 100 and thus a location of the package linked to TD 100. The location of the package may be specified as Cartesian coordinates, latitude and longitude, etc.

In step 520, a distance is calculated between the location of the driver (as extracted from the driver message) and the location of the package (as extracted from the TD status message). Those skilled in the art, having the benefit of this disclosure, will appreciate that when the driver is at the pickup location (or the intermediate location) to pick up the package, the driver's location will be close to the package's location. Once the timer finishes, the driver should be far away from the pickup location (or intermediate location) but the distance between the driver's location and the package's location should still be close because the package is allegedly in the driver's possession (e.g., the package is in the driver's vehicle).

In step 525, the distance is compared to a distance threshold. This comparison may be performed by logistics computer system 205. If the distance exceeds the distance threshold, this indicates that the package was not transferred to the driver. In other words, because the driver's location and the package's location are far away from each other, this indicates that the driver left the package behind at the pickup location and the pickup notification (from Step 502) is erroneous. This might occur, for example, if there are multiple packages that look the same at the pickup location and the driver took the wrong package (e.g., two similar packages were accidently switched).

When it is determined that the distance exceeds the distance threshold, the process proceeds to step 530, and a left-behind alert is issued (e.g., displayed) for the package. The left-behind alert may be issued by logistics computer system 205. The logistics computer system 205 may display various GUIs to one or more operators with status information regarding the one or more packages being transported. The left-behind alert may be a new dialog box that is displayed on top of the one or more of the GUIs and includes a message explaining what has triggered the alert. Additionally or alternatively, the left-behind alert may be a graphical change to the displayed status information for the package. For example, the color of the status information for the package may change from green to red, the size of the status information for the package may be increased on the screen, and/or the position of the status information for the package may be moved to the top of the screen or another prominent location. The logistics computer system 205 and/or one of its operations may transmit a message for display on the driver computing device 220 instructing the driver to return to the pickup location (or intermediate location) to collect the missing package.

Figure 6:
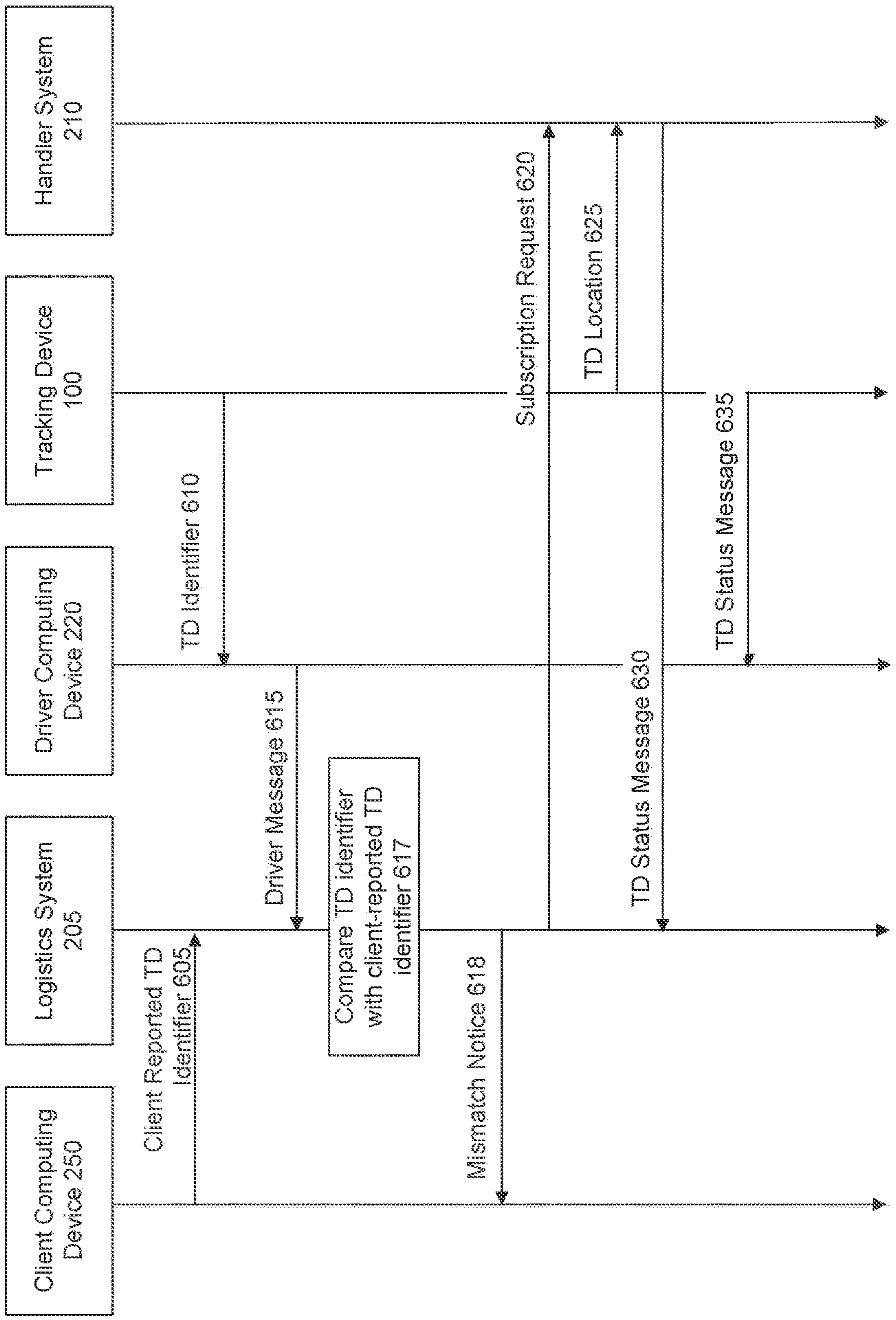
FIG. 6 shows a sequence diagram for an identifier mismatch scenario associated with a package in accordance with one or more embodiments.

FIG. 6 shows a sequence diagram for an identifier mismatch scenario associated with a package in accordance with one or more embodiments. As shown, the steps in FIG. 6 are executed by one or more of the components discussed above in reference to FIG. 2 (e.g., TD 100, logistics computer system 205, driver computing device 220, handler system 210, etc.). One or more of the steps shown in FIG. 6 may be omitted, repeated, and/or performed in a different order than the order shown in FIG. 6. Further, the steps shown in FIG. 6 may be inserted into or combined with any other process mentioned in this disclosure. Accordingly, the scope of the invention should not be considered limited to the specific arrangement of steps shown in FIG. 6.

In one or more embodiments, part of the sequence diagram in FIG. 6 describes a scenario where a package is being prepared by the client (e.g., sender) for pick up by a driver for a ground segment of the shipping itinerary. For example, the sender may be a manufacturer or a retailer of one or more items in the package.

As the client frequently ships items/packages, the client may be in possession of a set of TDs. As part of the package preparation process, the client may select one of the TDs (e.g., TD 100) and secure the selected TD 100 to the package or insert the selected TD 100 into the package. At step 605, the client uses the client computing device 250 to report the TD identifier of TD 100 to the logistics computer system 205. As discussed above, the selected TD 100 may display its TD identifier 110 on its display screen 135 (or the TD identifier 110 may be engraved or printed directly on the selected TD 100 or printed on a tag attached to the selected TD 100), and the client may input the TD identifier 110 into the client device 250 for transmission to the logistics computer system 205. The logistics computer system 205 may update the shipping itinerary (or one or more records associated with the shipping itinerary) to include the client reported TD identifier, effectively linking the package to the selected TD.

As discussed above, TD 100 may frequently transmit (e.g., broadcast) its TD identifier 110. In step 610, when the driver arrives to pick up the package, the driver's computing device 220 may receive/detect the TD identifier 110 being transmitted by the TD. At step 615, the driver's computing device 220 may transmit a driver message including the detected TD identifier to the logistics computer system 205.

At step 617, the logistics computer system 205 compares the client reported TD identifier (from step 605) with the TD identifier extracted from the driver message (from step 615). If the two identifiers are not equal, the logistics computer system 205 determines that the client reported the wrong TD identifier for the selected TD 100. For example, the client may have inadvertently transposed two or more digits when inputting the TD identifier. Additionally or alternatively, the client may be preparing multiple packages for shipment, and inadvertently switched the TD identifiers of two TDs.

In response to the mismatch, in step 618, the logistics computer system 205 transmits a mismatch notice to the client computing device 250 for display to the client (e.g., sender). The mismatch notice may include both the client-reported TD identifier and the TD identifier extracted from the driver message. The logistics computer system 205 may also replace the client-reported TD identifier stored in the shipping itinerary (or stored one or more records associated with the shipping itinerary) with the correct TD identifier extracted from the driver message. Further, the logistics computer system 205 may display the mismatch notice to one or more operators of the logistics computer system 205. Further still, status information regarding the package and displayed by the logistics computer system may change color, change size, and/or change position to notify the operators of the mismatch. Those skilled in the art, having the benefit of this disclosure, will appreciate that step 618 may be omitted if the client-reported TD identifier and the TD identifier extracted from the driver message match.

At step 620, the logistics computer system 205 transmits a subscription request to the handler system 210. As discussed above, the handler system 210 may be the manufacturer of TD 100. The subscription request includes the correct TD identifier for TD 100 linked to the package. The subscription request is a request from the logistics computer system 205 to receive TD status messages associated with TD 100. In other words, in response to the subscription request, when the handler system 210 receives data (e.g., a location, environmental condition measurements, battery charge, etc.) transmitted by TD 100, handler system 210 will generate a TD status message based on the received data (e.g., location, environmental condition measurements, battery charge, etc.) and transmit the TD status message to logistics computer system 205. Additionally or alternatively, handler system 210 may receive TD status messages from TD 100 and relay them to logistics computer system 205.

For example, at step 625, TD 100 transmits its location to handler system 210. In step 630, in response to having previously received the subscription request, handler system 210 generates a TD status message with the location and transmits the TD status message to logistics computer system 205. Tracking device 100 may also transmit TD status messages to the driver computing device 220 (step 635).

Figure 7:
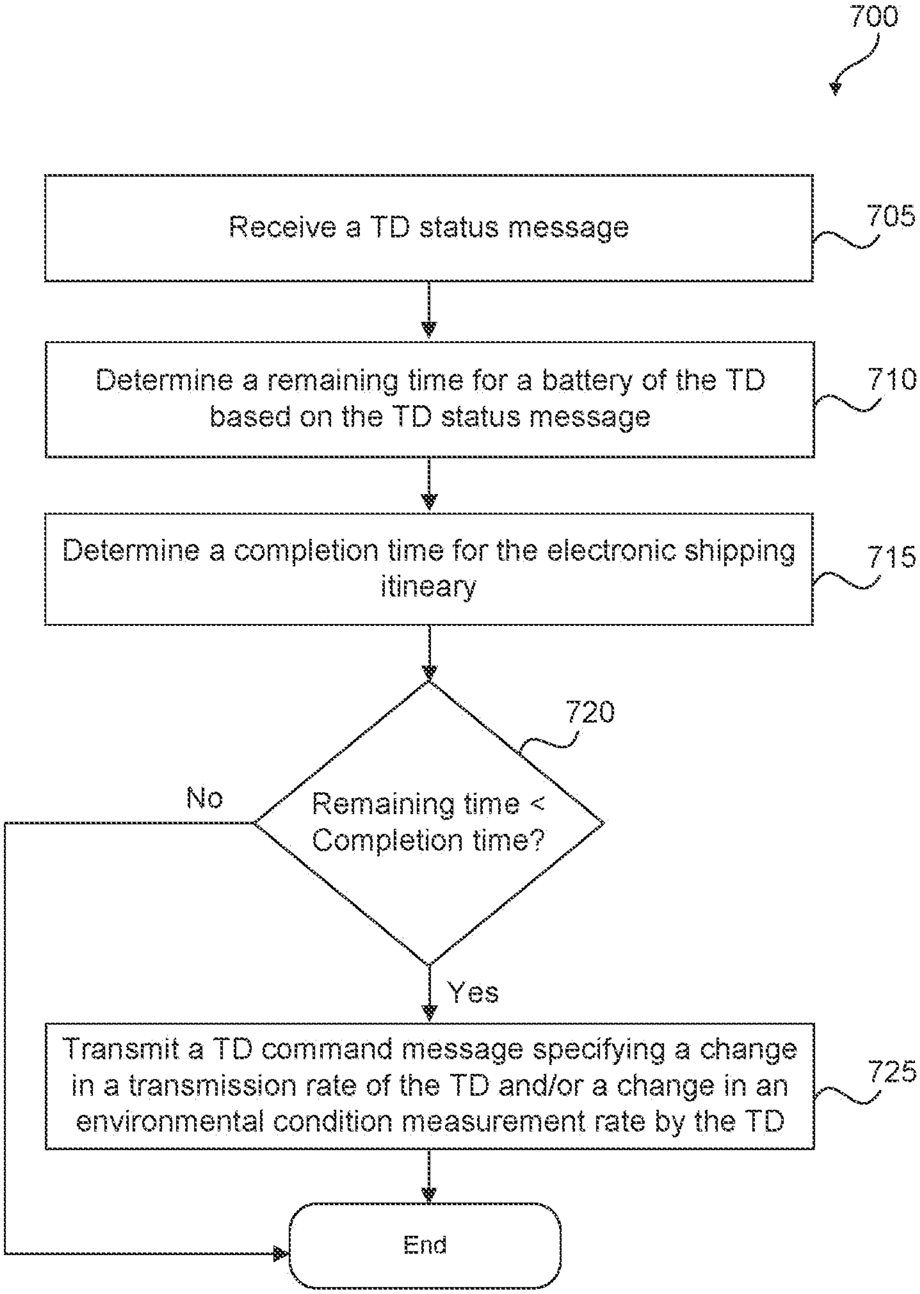
FIG. 7 shows a flowchart for managing battery life in accordance with one or more embodiments.

FIG. 7 shows a flowchart 700 for managing battery life in accordance with one or more embodiments. As shown, the steps in FIG. 7 are executed by one or more of the components discussed above in reference to FIG. 2 (e.g., TD 100, logistics computer system 205, etc.). One or more of the steps shown in FIG. 7 may be omitted, repeated, and/or performed in a different order than the order shown in FIG. 7. Further, the steps shown in FIG. 7 may be inserted into or combined with any other process mentioned in this disclosure. Accordingly, the scope of the invention should not be considered limited to the specific arrangement of steps shown in FIG. 7.

In one or more embodiments, the process depicted in FIG. 7 is directed towards managing battery life of battery 130 while TD 100 is secured to or inside a package being shipped. The process depicted in FIG. 7 may be performed multiple times during a single shipping itinerary.

In step 705, a TD status message is received. The TD status message may be received by logistics computer system 205. As discussed above, the TD status message may include a location of TD 100, one or more environmental condition measurements taken by TD 100, a timestamp, TD identifier 110, and a battery charge or remaining battery life of battery 130. The TD status message may be received directly from TD 100. Additionally or alternatively, the TD status message may be generated by another device (e.g., handler system 210, driver computer device 220, warehouse computing device 230, etc.) based on data transmitted by TD 100 to the another device.

In step 710, the remaining battery life (e.g., remaining time for battery 130) is determined based on the TD status message. If the TD status message includes the remaining battery life, then the remaining battery life may be extracted from the TD status message. Alternatively, if the TD status message specifies the battery charge, the remaining battery life may be estimated. For example, the remaining battery life may be extrapolated by comparing the battery charge and the timestamp specified in the TD status message (from step 705) with the battery charges and the timestamps specified in one or more previous TD status messages for TD 100.

In step 715, a completion time for the electronic shipping itinerary is determined by the logistics computer system 205. The completion time may be the expected or scheduled arrival time for the package at the destination location. This information may be specified in the shipping itinerary.

In step 720, it is determined whether the remaining time for battery 130 is less than the completion time for the shipping itinerary. This may represent an undesirable scenario as it is better for TD 100 to remain operational for the entire shipping itinerary and be used to track the package for the entire itinerary. When it is determined that the remaining time for battery 130 is less than the completion time, the process proceeds to step 725.

As discussed above, TD 100 has one or more environmental sensors 105 configured to take environmental condition measurements (e.g., temperature, pressure, oxygen levels, humidity, etc.). The frequency of these measurements is specified by measurement rates 120. As also discussed above, TD 100 is also configured to transmit its location, the environmental condition measurements, battery charge, etc. The frequency of these transmissions is specified by TX rate 115. Those skilled in the art, having the benefit of this disclosure, will appreciate that executing these measurements and transmitting this data drains battery 130.

In step 725, a TD command message is transmitted to TD 100. The TD command message specifies a change (e.g., decrease) in TX rate 115 and/or a change (e.g., decrease) in measurement rates 120. The TD command message may be transmitted by logistics computer system 205 to TD 100. Additionally or alternatively, the TD command message may be transmitted by logics computer system 205 to another device (e.g., handler system 210, warehouse computing device 230, driver computing device 220), which then relays the TD command message, with or without additional formatting, to TD 100. TD 100 then stores the new TX rate 115 and/or the new measurements rates 120. If these new rates are lower, power consumption will be reduced, and the remaining battery life for battery 130 will increase and exceed the remaining time for the shipping itinerary. This will enable the package to be tracked for the entire shipping itinerary. Moreover, if an environmental condition measurement rate (e.g., temperature measurement rate) is changed to zero, the environmental sensor responsible for measuring the environmental condition may be turned off. This also reduces power consumption.

Additionally or alternatively, in one or more embodiments, the TD command message transmitted to the TD 100 includes the completion time for the electronic shipping itinerary (from 715). The TD 100 then compares the remaining battery life with the completion time and calculates reductions in one or more of the measurements rates 120 and/or calculates a reduction in the TX rate 115 to make the battery last beyond the completion time by a safety amount/factor.

Although FIG. 7 focuses on reducing rates in order to increase the remaining time for battery 130, in some embodiments, the remaining time for battery 130 may significantly exceed the completion time of the shipping itinerary. In such embodiments, the TD command message may specify an increase in measurement rates 120 and/or an increase in TX rate 115. These increases will consume more power and reduce the remaining battery life of battery 130. However, these increases will allow for additional data points while tracking the package. These increases may be especially useful near a critical milestone (e.g., flight takeoff for a flight segment) in the shipping itinerary. Accordingly, the TD command message to increase measurement rates 120 and/or TX rate 115 (and thus generate more data points) may be transmitted to TD 100 just before the critical milestone or immediately following the critical milestone.

In general, the shipping itinerary may specify different transmission rates for different segments or milestones. Logistics computer system 205 may transmit TD command messages with the new transmission rates once these segments have started (or just before the segments start) and/or once the milestones are reached (or are about to be reached).

Figure 8:
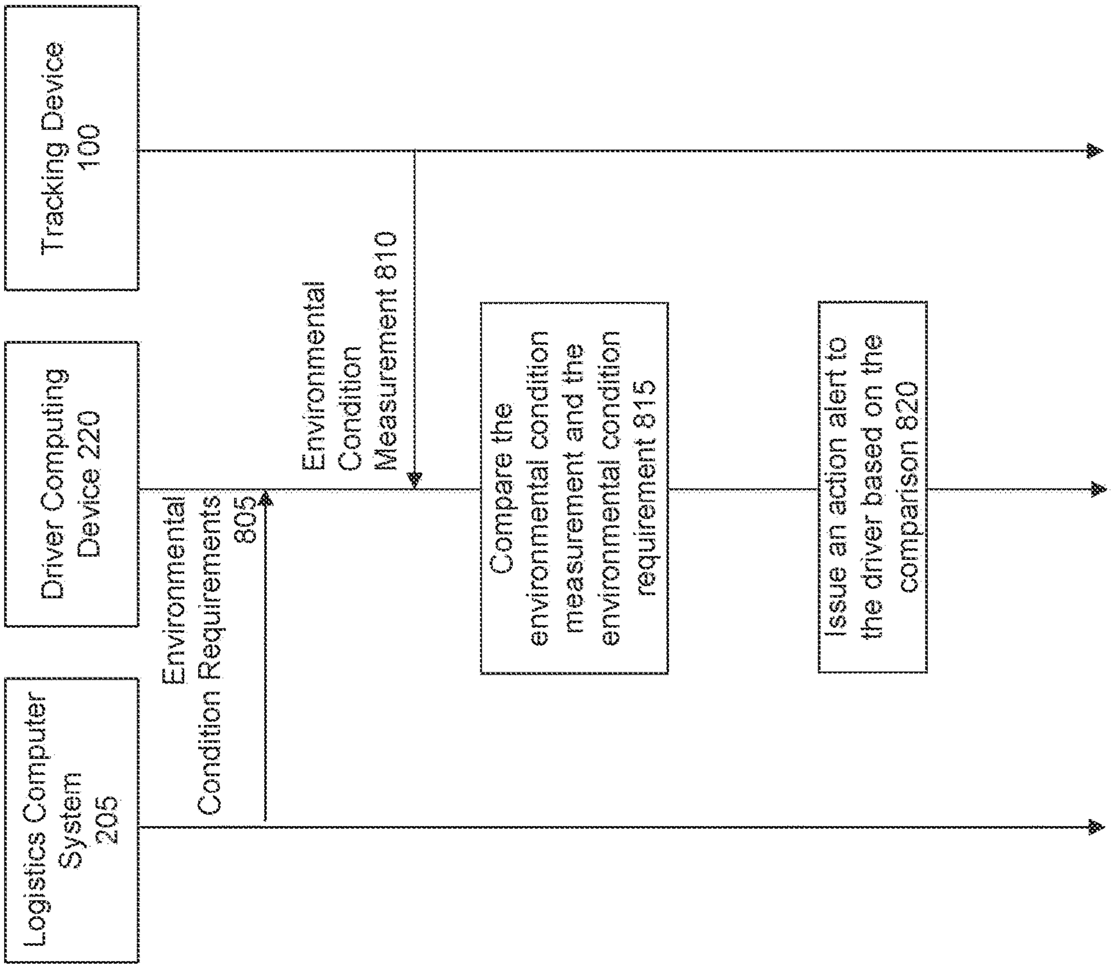
FIG. 8 shows a flowchart for a driver intervention scenario in accordance with one or more embodiments.

FIG. 8 shows a sequence diagram for a driver intervention scenario in accordance with one or more embodiments. As shown, the steps in FIG. 8 are executed by one or more of the components discussed above in reference to FIG. 2 (e.g., TD 100, logistics computer system 205, driver computing device 220). One or more of the steps shown in FIG. 8 may be omitted, repeated, and/or performed in a different order than the order shown in FIG. 8. Further, the steps shown in FIG. 8 may be inserted into or combined with any other process mentioned in this disclosure. Accordingly, the scope of the invention should not be considered limited to the specific arrangement of steps shown in FIG. 8.

The process depicted in FIG. 8 corresponds to a ground segment of the shipping itinerary, where a driver is transporting the package to an intermediate location (for transfer to another segment) or to the destination location.

At 805, logistics computer system 205 transmits the environmental condition requirements for the ground segment to the driver computing device 220. The environmental conditions for the ground segment may be specified in the shipping itinerary (or in one or more records associated with the shipping itinerary). For example, it may be necessary that the package (or the one or more items in the package) be kept between −10° C. and −5° C. during the ground segment.

During the ground segment, the package (and thus TD 100) may be in the driver's vehicle while the driver is driving to an intermediate location (e.g., airport) or the destination location. During this ground segment, TD 100 may be frequently taking measurements of environmental conditions (e.g., temperature) using environmental sensors 105. At step 810, TD 100 transmits these environmental condition measurements to driver computing device 220. TD 100 may also transmit these environmental condition measurements to logistics computer system 205.

At step 815, the driver computing device 220 compares the environmental condition measurements, as received from TD 100, with the environmental condition requirements for the package during ground segment, as received from logistics computer system 205. The logistics computer system 205 may also compare the environmental condition measurements with the environmental condition requirements.

At step 820, an action alert is issued to the driver and/or operators of the logistics computer system 205 based on the comparison. Specifically, if the measurements are outside the range(s) specified in the environmental condition requirements or the measurements are quickly approaching the upper or lower bounds of the range(s), the action alert is displayed on the driver computing device 220 or on a GUI displayed to an operator of the logistics computer system 205. If the action alert is displayed on the driver computing device 220, the action alert may instruct the driver to stop the vehicle and act (e.g., intervene) to keep the environmental conditions of the package consistent with the requirements received from logistics computer system 205 at step 805. For example, if the package temperature is increasing, the driver may be instructed to start a cooling procedure (e.g., surround the package with ice) to keep the package cool and within the range(s) specified by the environmental condition requirements. If the action alert is displayed on the logistics computer system 205, an operator of the logistics computer system 205 may contact the driver and instruct the driver to intervene (e.g., start cooling procedure).

Those skilled in the art, having the benefit of this disclosure, will appreciate that by having the driver computing device 220 and/or logistics computer system 205 monitor the environmental condition measurements and issue action alerts, the driver can quickly intervene if there is a problem, and it is more likely that items in the package requiring strict environmental conditions (e.g., human tissue for transplant, vaccines, etc.) will still be viable upon arrival at the destination location.

Figure 9:
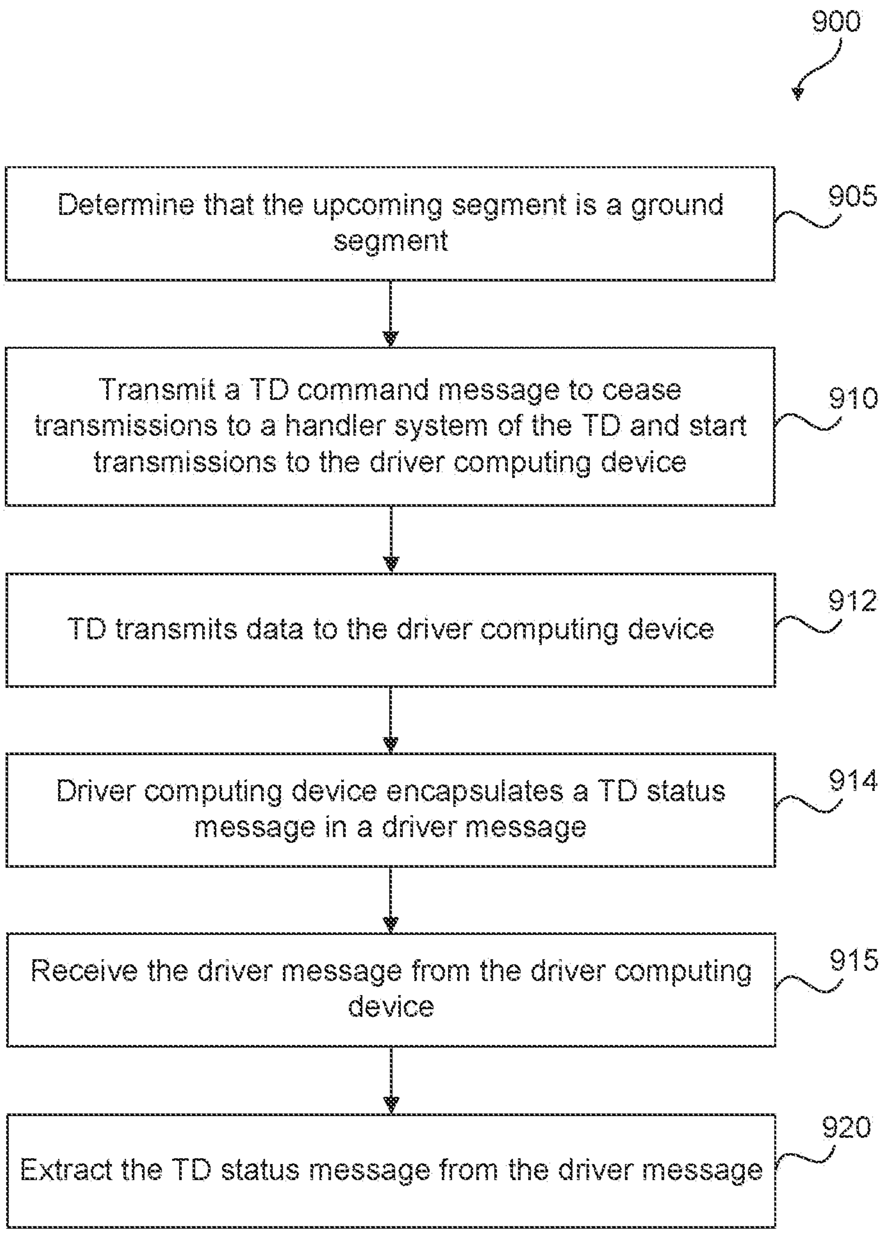
FIG. 9 shows a flowchart for utilizing a driver computing device in accordance with one or more embodiments.

FIG. 9 shows a flowchart 900 for utilizing a driver computing device in accordance with one or more embodiments. As shown, the steps in FIG. 9 are executed by one or more of the components discussed above in reference to FIG. 2 (e.g., TD 100, logistics computer system 205, driver computing device 220, etc.). One or more of the steps shown in FIG. 9 may be omitted, repeated, and/or performed in a different order than the order shown in FIG. 9. Further, the steps shown in FIG. 9 may be inserted into or combined with any other process mentioned in this disclosure. Accordingly, the scope of the invention should not be considered limited to the specific arrangement of steps shown in FIG. 9.

In one or more embodiments, the process depicted in FIG. 9 is directed towards maintaining communication with TD 100, while the package associated with TD 100 is on a ground segment of the shipping itinerary.

In step 905, it is determined that the upcoming segment (e.g., next segment) in the shipping itinerary is a ground segment. This may be determined by logistical computer system 205. Moreover, this may be determined by comparing the most recent location of the TD 100 with the electronic shipping itinerary.

In step 910, a TD command message is transmitted to TD 100. The TD command message may instruct TD 100 to cease transmissions (e.g., TD identifier, location, environmental condition measurements, battery charge, etc.) to the handler system 210 and/or logistics computer system 205 during the ground segment, and instead, start transmissions to the driver computing device 220. As discussed above, TD 100 may communicate with the handler system 210 and/or logistics computer system 205 using a cellular network, while TD 100 may communicate with driver computing device 220 using a short-range wireless protocol (e.g., Bluetooth®), which consumes less power. Accordingly, by utilizing the close proximity of the driver computing device 220 to TD 100 during the ground segment (e.g., while the driver is driving the package to the next intermediate location or destination location), power consumption by TD 100 may be reduced. Additionally or alternatively, upon detection of a failure of the communication channel between TD 100 and handler system 210, TD 100 may switch to transmitting to driver computing device 220.

As discussed above, TD 100 frequently transmits data (e.g., TD identifier 110, TD location, one or more environmental condition measurements, etc.). In 912, in response to the TD command received by TD 100 in step 910 and/or the detection of a communication channel failure, TD 100 now transmits this data (or a TD status message with the data) to driver computing device 220 instead of handler system 210.

As also discussed above, driver computing device 220 routinely transmits a driver message to logistics computer system 205. In step 914, driver computing device 220 may encapsulate the TD status messages (received from TD 100 or generated by driver computing device 220 based on the data received from TD 100) in driver messages, and transmit the driver messages to the logistical computer system 205.

In step 915, a driver message is received. The driver message may be received by logistical computer system 205. In step 920, logistical computer system 205 may extract the TD status message and take any action disclosed based on the data (e.g., TD identifier 110, TD location, one or more environmental condition measurements, etc.) in the TD status message.

Figure 10:
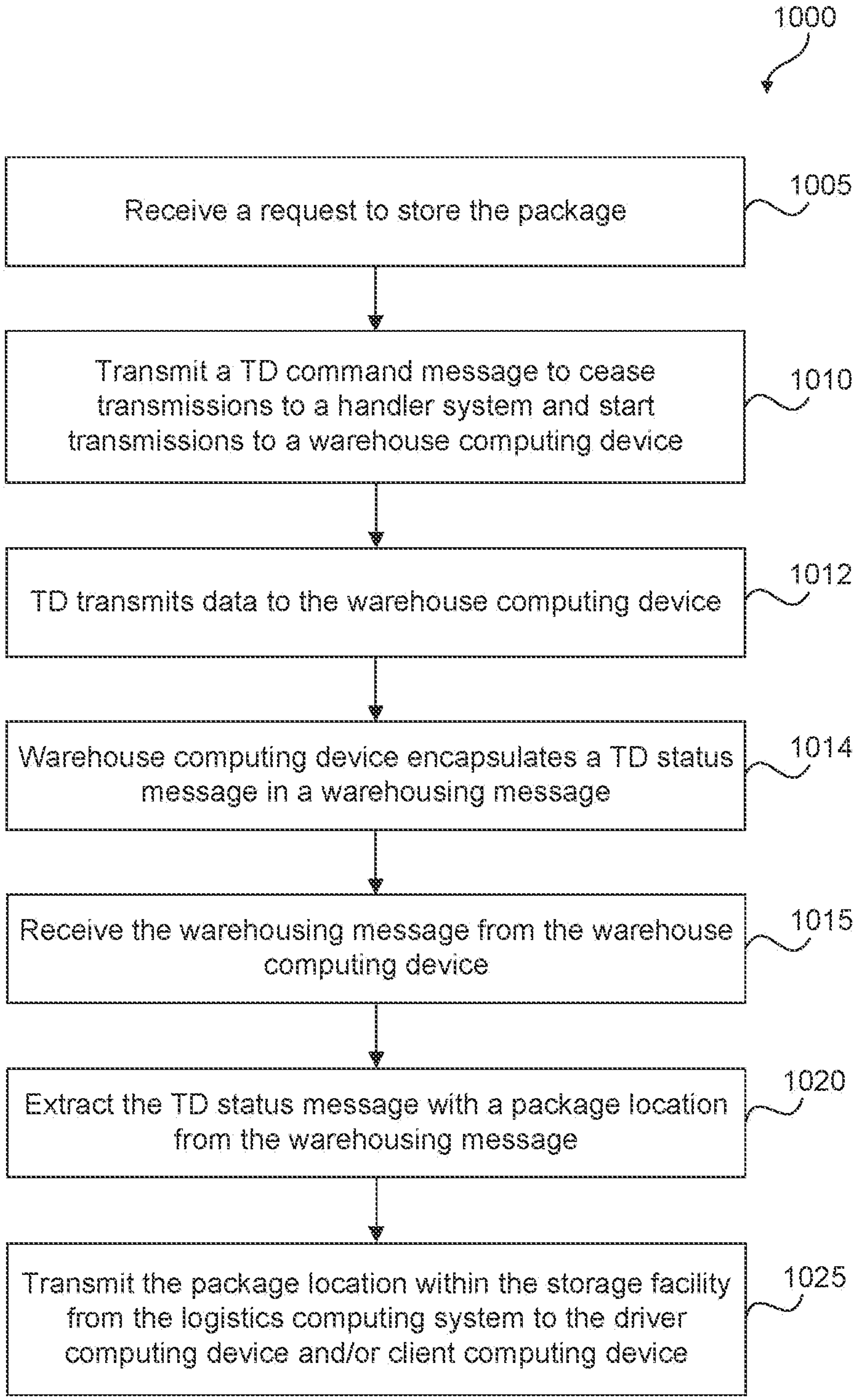
FIG. 10 shows a flowchart for utilizing a warehouse computing device in accordance with one or more embodiments.

FIG. 10 shows a flowchart 1000 for utilizing a warehouse computing device in accordance with one or more embodiments. As shown, the steps in FIG. 10 are executed by one or more of the components discussed above in reference to FIG. 2 (e.g., TD 100, logistics computer system 205, driver computing device 220, etc.). One or more of the steps shown in FIG. 10 may be omitted, repeated, and/or performed in a different order than the order shown in FIG. 10. Further, the steps shown in FIG. 10 may be inserted into or combined with any other process mentioned in this disclosure. Accordingly, the scope of the invention should not be considered limited to the specific arrangement of steps shown in FIG. 10.

In one or more embodiments, the process depicted in FIG. 10 is directed towards storing the package linked to TD 100. At any time before, during, and/or after the package is shipped, a request to store the package may be received (step 1005). The request to store the package may be received by logistics computer system 205 and may be an indication that the package will be placed in an indoor or outdoor storage facility. The storage facility may include warehouse computing device 230 capable of communicating with TD 100.

In step 1010, a TD command message is transmitted to TD 100. The TD command message may instruct TD 100 to cease transmissions (e.g., TD identifier, location, environmental condition measurements, battery charge, etc.) to the handler system 210 while the package is stored, and instead, start transmissions to warehouse computing device 230. As discussed above, TD 100 may communicate with handler system 210 using a cellular network, while TD 100 may communicate with warehouse computing device 230 using a short-range wireless protocol (e.g., WiFi, Bluetooth®), which consumes less power.

As discussed above, TD 100 periodically transmits data (e.g., TD identifier 110, TD location, one or more environmental condition measurements, etc.) to handler system 210. In 1012, in response to the TD command message in step 1010, TD 100 now transmits this data (or TD status messages with the data) to warehouse computing device 230 instead of handler system 210.

In step 1014, warehouse computing device 230 may encapsulate TD status messages (received from TD 100 or generated by warehouse computing device 230 based on data received from TD 100) in warehousing messages, and transmit the warehouse messages to logistical computer system 205.

The package may be in storage for hours, days, weeks, months, etc. For example, if the storage facility is associated with a merchant, the package may remain in storage until the merchant finds a customer to buy the one or more items in the package. As another example, if the storage facility is associated with the receiver at the destination location of the shipping itinerary, the package may remain in storage until the receiver is ready to use the one or more items in the package. As yet another example, the storage facility may be associated with an intermediate location in the shipping itinerary (e.g., airport, rail yard, transport hub for exchange between drivers, etc.). In this example, the package may remain in storage until the next segment of the shipping itinerary begins.

In step 1015, a warehousing message is received from warehouse computing device 230. The warehousing message may be received by logistics computer system 205. In step 1020, logistics computer system 205 may extract the TD status message from the warehousing message. The extracted TD status message includes the location of TD 100 and thus the location of the stored package within the storage facility.

In step 1025, the logistics computer device 220 transmits the location of the stored package to client computing device 250 and/or driver computing device 220. For example, if it is time to start the first or next segment of the shipping itinerary, the location of the stored package may be transmitted to the driver computing device 220. As another example, if the package is being stored at the destination location and the receiver is now ready to use the one or more items in the package, the location of the stored package may be sent to the client computing device 250 operated by the receiver. Those skilled in the art, having the benefit of this detailed description, will appreciate that an indoor or outdoor storage facility may be immense in size and store hundreds or even thousands of packages. By transmitting the location of the package to the driver computing device 220 and/or the client computing device 250, the driver, receiver, or anyone else will be able to quickly find the package within the storage facility.

Additionally or alternatively, the warehouse computing device 230 may transmit the TD location (and thus the location of the package) within the storage facility directly to the client computing device 250 and/or driver computing device 220.

Figure 11:
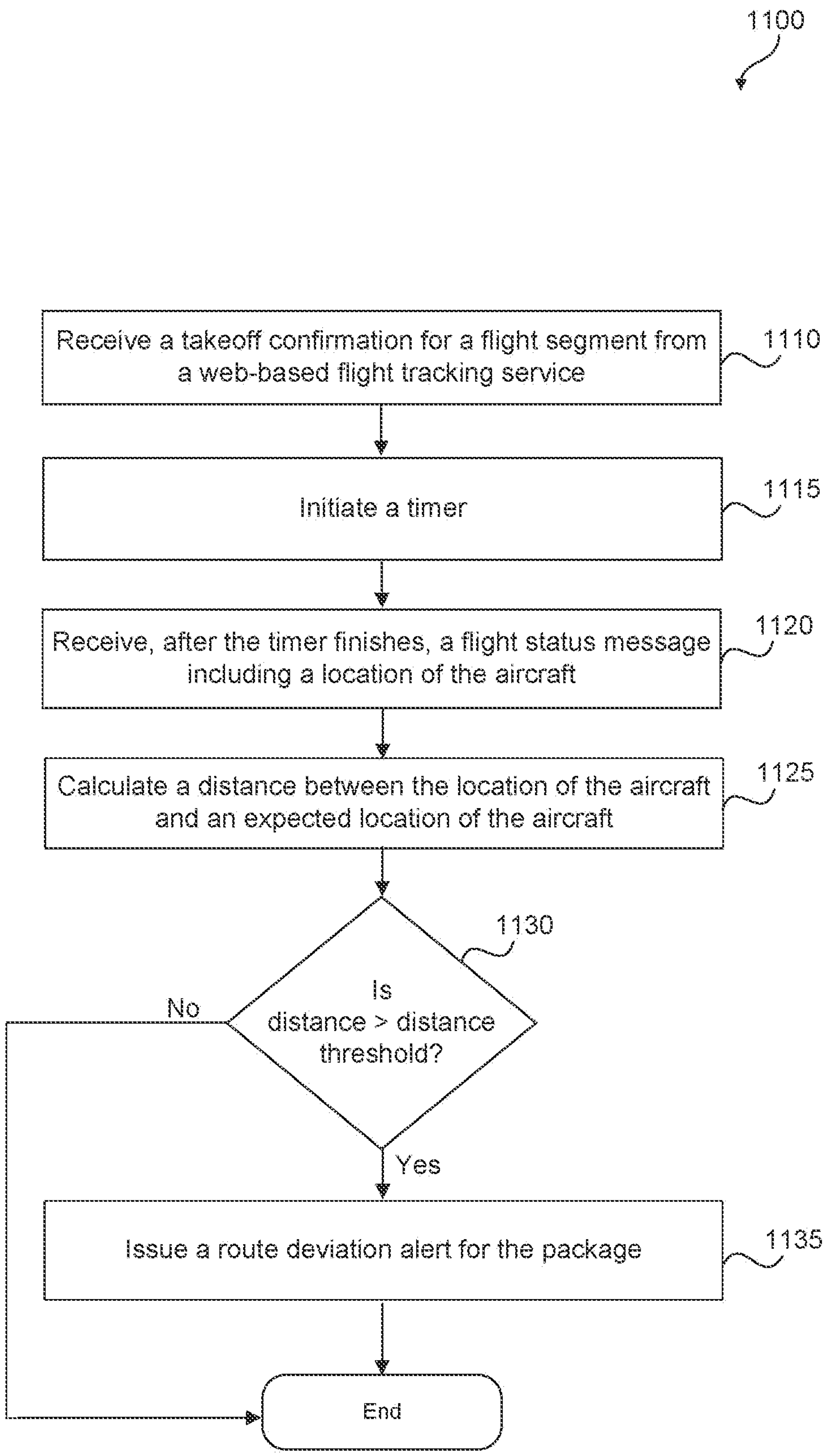
FIG. 11 shows a flowchart for issuing a route deviation alert in accordance with one or more embodiments.

FIG. 11 shows a flowchart 1100 for issuing a route deviation alert in accordance with one or more embodiments. As shown, the steps in FIG. 11 are executed by one or more of the components discussed above in reference to FIG. 2 (e.g., TD 100, logistics computer system 205, etc.). One or more of the steps shown in FIG. 11 may be omitted, repeated, and/or performed in a different order than the order shown in FIG. 11. Further, the steps shown in FIG. 11 may be inserted into or combined with any other process mentioned in this disclosure. Accordingly, the scope of the invention should not be considered limited to the specific arrangement of steps shown in FIG. 11.

In one or more embodiments, the process depicted in FIG. 11 is directed towards tracking the package linked to TD 100 during a flight segment of the shipping itinerary. In order to comply with aviation laws and regulations, TD 100 might not transmit data while the package is in flight.

In step 1110, a takeoff confirmation for the flight segment is received. The takeoff confirmation is received by logistics computer system 205. The takeoff confirmation indicates to logistics computer system 205 that the aircraft associated with the flight segment and transporting the package has departed. The takeoff confirmation may include the flight number, the destination, the estimated flight time, etc. The shipping itinerary (or one or more records associated with the shipping itinerary) may be updated to include the takeoff confirmation or to indicate the takeoff confirmation has been received. The takeoff confirmation may be issued by a web-based flight tracking service. For example, logistics computer system 205 may transmit, in advance, information regarding the flight segment(s) (e.g., flight dates, flight numbers, etc.) in the shipping itinerary to the web-based flight tracking service, and then the web-based flight tracking service may issue takeoff confirmations to the logistics computer system 205 when any of the flights of interest have departed. In one or more embodiments, the flight segment is a new flight segment or a replacement flight segment because the package was not placed on board the original flight segment (as discussed above in reference to FIG. 3).

In step 1115, a timer is initiated. The timer may be initiated by logistics computer system 250. The timer may be set for 7 minutes, 10 minutes, 30 minutes, etc. When a flight takes off, the aircraft may circle above the airport until a safe altitude is reached and the aircraft can head towards the destination airport. Accordingly, during the circling process, the location and/or direction of the aircraft may appear to be inconsistent with the destination airport. The timer is a deliberate delay to prevent tracking of the aircraft before the aircraft is heading towards the destination airport.

In step 1120, a flight status message is received after the timer finishes. Any flight status message received before the timer finishes may be ignored to discarded. The flight status message may be sent by the web-based flight tracking service and received by the logistics computer system 205 The flight status message may include a timestamp and location of the aircraft at the timestamp. As discussed above, because the flight status message is received after the timer finished, the aircraft is unlikely to still be circling.

In step 1125, a distance is calculated between the location of the aircraft, as specified in the flight status message, and the expected location of the aircraft. The distance may be calculated by the logistics computer system 205. The expected location of the aircraft may be specified in the shipping itinerary and/or may be interpolated from the data in the shipping itinerary.

In step 1130, the calculated distance is compared to a threshold distance. When the distance exceeds the threshold distance, this is an indication that the aircraft is no longer heading to the destination airport because the aircraft is no longer on the flight path leading to the destination airport. For example, the aircraft might be heading to a different airport because of a mechanical issue, weather, a medical emergency on board the aircraft, etc.

In step 1135, a route deviation alert is issued (e.g. displayed) for the package by logistics computer system 205. This may trigger additional investigations into the new destination airport for the aircraft and investigations into one or more new/replacement segments originating from the new airport in order to transport the package to the destination location specified in the shipping itinerary. The route deviation alert may be similar to the route deviation alert discussed above in reference to FIG. 4 (e.g., displaying dialog boxes to operators, changing the color, size, positions of a status information regarding the package on GUIs, etc.).

Although the process 1100 depicted in FIG. 11 focuses on comparing the reported actual location of the aircraft with the expected location of the aircraft while the aircraft is in flight, in other embodiments, a web-based flight tracking service may provide a new arrival airport for the aircraft. This new arrival airport may be pushed to the logistics computer system while the aircraft in flight. There may be a change in the arrival airport because the flight is being diverted due to weather, a medical emergency with one of the passengers, a mechanical issue with the aircraft, etc. As a result of this new arrival airport, a route deviation alert is issued for the package (as discussed in step 1135).

Figure 12:
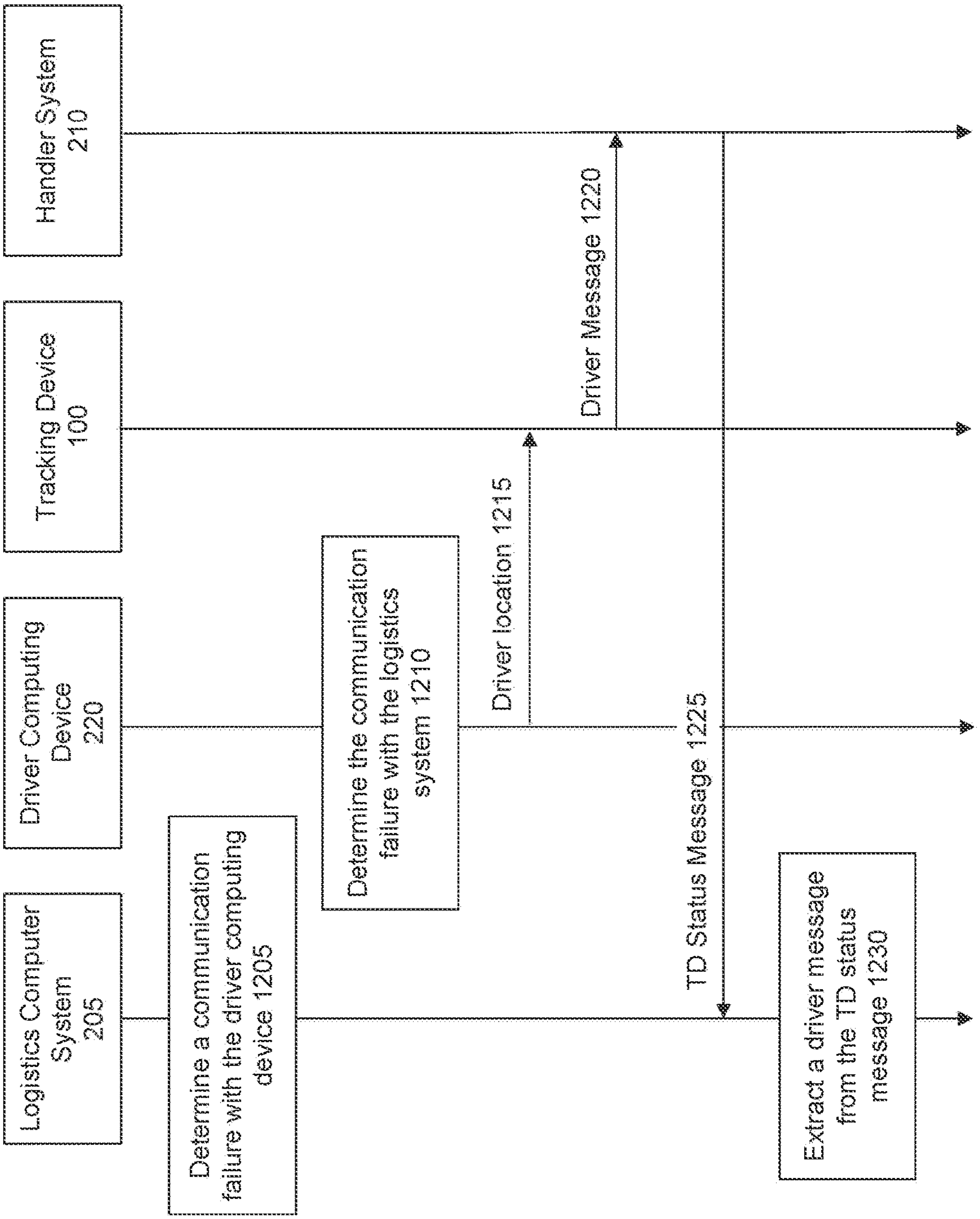
FIG. 12 shows a sequence diagram for utilizing a tracking device for transmitting driver messages in accordance with one or more embodiments.

FIG. 12 shows a sequence diagram for utilizing a tracking device for transmitting driver messages in accordance with one or more embodiments. As shown, the steps in FIG. 12 are executed by one or more of the components discussed above in reference to FIG. 2 (e.g., TD 100, logistics computer system 205, driver computing device 220, handler system 210, etc.). One or more of the steps shown in FIG. 12 may be omitted, repeated, and/or performed in a different order than the order shown in FIG. 12. Further, the steps shown in FIG. 12 may be inserted into or combined with any other process mentioned in this disclosure. Accordingly, the scope of the invention should not be considered limited to the specific arrangement of steps shown in FIG. 12.

In one or more embodiments, part of the sequence diagram in FIG. 12 describes a scenario where there is a communication failure between logistics computer system 205 and driver computing device 220 during a ground segment. The package with TD 100 is being transported by the driver's vehicle (e.g., car, truck, van, etc.).

In step 1205, the logistics computer system 205 identifies or detects a communication failure with the driver computing device 220. The communication failure may be detected because the logistics computer system 205 is no longer receiving periodic driver messages from driver computing device 220.

In step 1210, the driver computing device 220 identifies or detects the communication failure with logistics computer system 205. The communication failure may be detected because the driver computing device 220 is no longer receiving acknowledgements from logistics computer system 205. Additionally or alternatively, the communication failure may be detected because the driver computing device 220 is unable to detect a strong cellular signal for communicating with logistics computer system 205.

In one or more embodiments, although the driver computing device 220 is unable to communicate with logistics computer system 205, TD 100 (attached to the package being transported by the driver) may still be able to communicate with logistics computer system 205.

In step 1215, driver computing device 220 may transmit the driver's location, as determined by driver computing device 220, to TD 100 in response to the communication failure. Driver computing device 220 may also transmit additional data to TD 100 in response to the communication failure.

In step 1220, TD 100 generates a driver message based on the data (e.g., driver location) received from driver computing device 220 and transmits the driver message to handler system 210. Additionally or alternatively, TD 100 receives the driver message from driver computing device 220 and relays the driver message to handler system 210. In addition to the driver message, TD 100 may also transmit TD location, environmental condition measurements, battery charge, TD identifier 110, etc. to handler system 210.

In step 1225, handler system 210 transmits a TD status message to logistics computer system 205. The TD status message includes the data (e.g., TD location, TD identifier 110, environmental condition measurements, etc.). The TD status message also includes or encompasses the driver message. In other words, the driver message may be encapsulated in the TD status message.

In step 1230, in response to identifying the communication failure, logistics computer system 205 extracts the driver message from the received TD status message. As logistics computer system 205 can determine that TD 100 is with the driver on the ground segment, and as logistics computer system 205 can also determine the TD identifier 110 associated with TD 100, logistics computer system 205 can attempt to extract a driver message from a TD status message with TD identifier 110.

Figure 13:
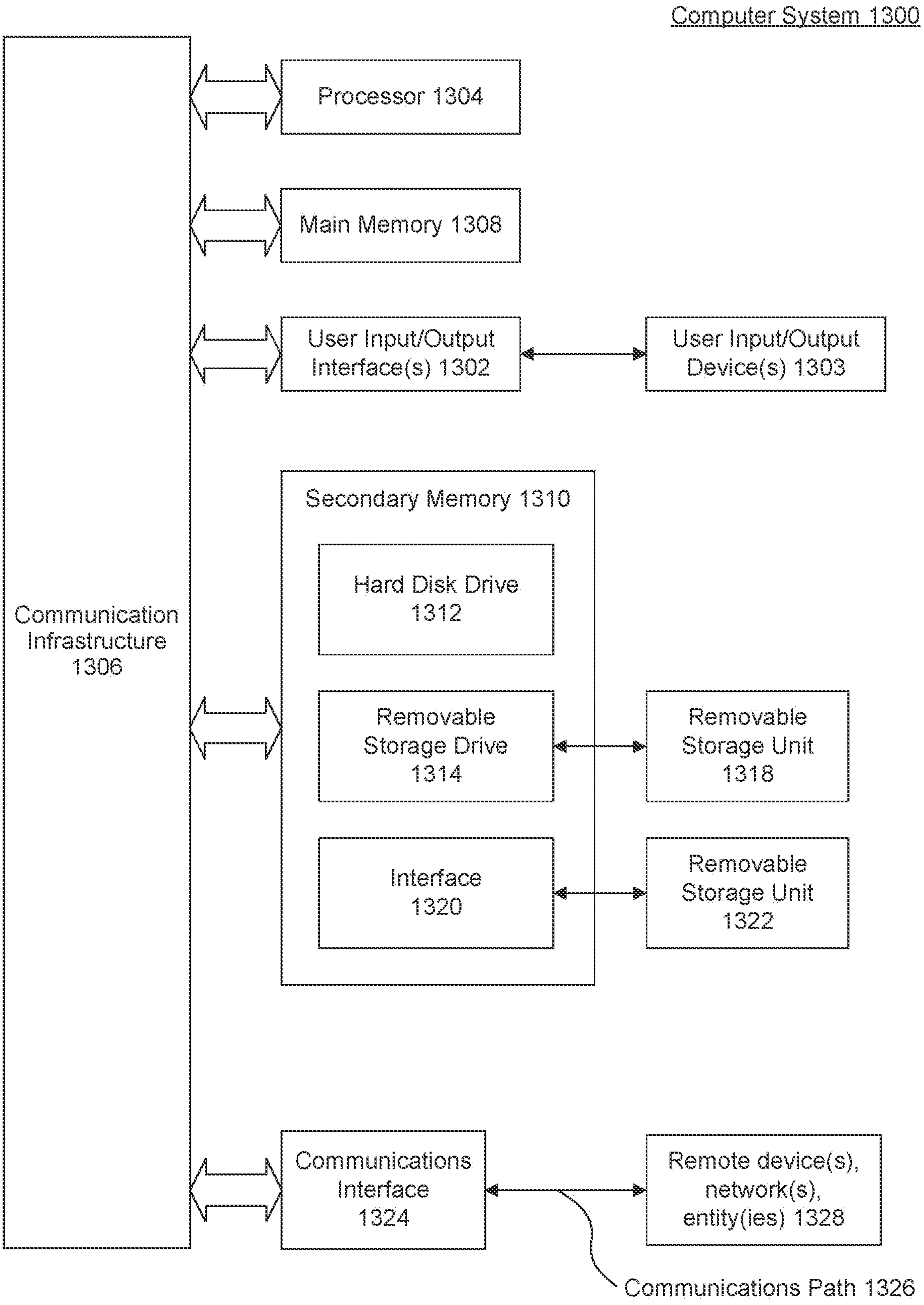
FIG. 13 shows a computer system in accordance with one or more embodiments.

Various embodiments can be implemented, for example, using one or more computer systems, such as computer system 1300 shown in FIG. 13. Computer system 1300 can be used, for example, to implement the processes shown in FIGS. 3-12. Computer system 1300 can be any computer capable of performing the functions described herein.

Computer system 1300 includes one or more processors (also called central processing units, or CPUs), such as a processor 1304. Processor 1304 is connected to a communication infrastructure or bus 1306.

One or more processors 1304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1300 also includes user input/output device(s) 1303, such as monitors, keyboards, pointing devices, etc., that communicate with communication infrastructure 1306 through user input/output interface(s) 1302.

Computer system 1300 also includes a main or primary memory 1308, such as random access memory (RAM). Main memory 1308 may include one or more levels of cache. Main memory 1308 has stored therein control logic (i.e., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 includes a computer usable or readable storage device having stored thereon computer software (control logic) and/or data. Removable storage unit 1318 may be a floppy disk, magnetic tape, compact disk, DVD, optical storage disk, and/any other computer data storage device. Removable storage drive 1314 reads from and/or writes to removable storage unit 1318 in a well-known manner.

According to an exemplary embodiment, secondary memory 1310 may include other means, instrumentalities or other approaches for allowing computer programs and/or other instructions and/or data to be accessed by computer system 1300. Such means, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 enables computer system 1300 to communicate and interact with any combination of remote devices, remote networks, remote entities, etc. (individually and collectively referenced by reference number 1328). For example, communication interface 1324 may allow computer system 1300 to communicate with remote devices 1328 over communications path 1326, which may be wired and/or wireless, and which may include any combination of LANs, WANs, the Internet, etc. Control logic and/or data may be transmitted to and from computer system 1300 via communication path 1326.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 13. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:

receiving, by a handler system, a request from a customer device to transport a package from a first location to a second location;

generating an electronic shipping itinerary for the package based on the request, the electronic shipping itinerary comprising a flight segment;

transmitting a flight number associated with the flight segment to a flight tracking system;

receiving, at the handler system, a status message comprising an environmental condition measurement from a tracking device incorporated into a label affixed to an exterior of the package, wherein the tracking device comprises an environmental sensor;

receiving, at the handler system, from an auxiliary computing device, a second status message that encapsulates two or more environmental condition measurements and two or more corresponding timestamps communicated from the tracking device to the auxiliary computing device;

determining that a second environmental condition measurement in the two or more environmental condition measurements is outside an environmental condition requirement for a ground segment of the electronic shipping itinerary by comparing the second environmental condition measurement to the environmental condition requirement;

in response to the determining, issuing an action alert at the handler system, the action alert comprising the second environmental condition measurement;

receiving a carrier acceptance confirmation from the auxiliary computing device that indicates a transfer of the package to an aircraft, wherein the tracking device ceases transmissions in response to a change in pressure caused by a take-off of the aircraft and resumes transmissions in response to a second change in pressure caused by a landing of the aircraft;

receiving a departure confirmation for the flight segment pushed from the flight tracking system to the handler system; and displaying the departure confirmation for the package in a graphical user interface as a graphical change to displayed status information for the package.

2. The method of claim 1, wherein the environmental sensor measures temperature, humidity, oxygen content, atmospheric pressure, acceleration, speed, or light intensity.

3. The method of claim 1, wherein the environmental sensor has a first configurable measurement rate, and wherein the tracking device comprises a second environmental sensor having a second configurable measurement rate.

4. The method of claim 3, further comprising:

transmitting a command message to the tracking device to cause the tracking device to change the first configurable measurement rate to modify a remaining battery life.

5. The method of claim 1, wherein the tracking device further comprises a global positioning system receiver.

6. The method of claim 1, wherein the status message further comprises a tracking device identifier, a location of the tracking device, a remaining battery life, and a timestamp.

7. The method of claim 1, further comprising:

transmitting a command message to the tracking device to cause the tracking device to stop transmitting to the handler system and start transmitting to a warehouse system.

8. A system, comprising:

a memory; and at least one processor coupled to the memory and configured to:

receive, by a handler system, a request from a customer device to transport a package from a first location to a second location;

generate an electronic shipping itinerary for the package based on the request, the electronic shipping itinerary comprising a flight segment;

transmit a flight number associated with the flight segment to a flight tracking system;

receive, at the handler system, a status message comprising an environmental condition measurement from a tracking device incorporated into a label affixed to an exterior of the package, wherein the tracking device comprises an environmental sensor;

receive, at the handler system, from an auxiliary computing device, a second status message that encapsulates two or more environmental condition measurements and two or more corresponding timestamps communicated from the tracking device to the auxiliary computing device;

determine that a second environmental condition measurement in the two or more environmental condition measurements is outside an environmental condition requirement for a ground segment of the electronic shipping itinerary by comparing the second environmental condition measurement to the environmental condition requirement;

in response to the determining, issue an action alert at the handler system, the action alert comprising the second environmental condition measurement;

receive a carrier acceptance confirmation from the auxiliary computing device that indicates a transfer of the package to an aircraft, wherein the tracking device ceases transmissions in response to a change in pressure caused by a take-off of the aircraft and resumes transmissions in response to a second change in pressure caused by a landing of the aircraft;

receive a departure confirmation for the flight segment pushed from the flight tracking system to the handler system; and display the departure confirmation for the package in a graphical user interface as a graphical change to displayed status information for the package.

9. The system of claim 8, wherein the environmental sensor measures temperature, humidity, oxygen content, atmospheric pressure, acceleration, speed, or light intensity.

10. The system of claim 8, wherein the environmental sensor has a first configurable measurement rate, and wherein the tracking device comprises a second environmental sensor having a second configurable measurement rate.

11. The system of claim 10, the at least one processor further configured to:

transmit a command message to the tracking device to cause the tracking device to change the first configurable measurement rate to modify a remaining battery life.

12. The system of claim 8, wherein the tracking device further comprises a global positioning system receiver.

13. The system of claim 8, wherein the status message further comprises a tracking device identifier, a location of the tracking device, a remaining battery life, and a timestamp.

14. The system of claim 8, the at least one processor further configured to:

transmit a command message to the tracking device to cause the tracking device to stop transmitting to the handler system and start transmitting to a warehouse system.

15. A non-transitory computer-readable device having instructions stored thereon that, when executed by at least one computing device, cause the at least one computing device to perform operations comprising:

receiving, by a handler system, a request from a customer device to transport a package from a first location to a second location;

generating an electronic shipping itinerary for the package based on the request, the electronic shipping itinerary comprising a flight segment;

transmitting a flight number associated with the flight segment to a flight tracking system;

receiving, at the handler system, a status message comprising an environmental condition measurement from a tracking device incorporated into a label affixed to an exterior of the package, wherein the tracking device comprises an environmental sensor;

receiving, at the handler system, from an auxiliary computing device, a second status message that encapsulates two or more environmental condition measurements and two or more corresponding timestamps communicated from the tracking device to the auxiliary computing device;

determining that a second environmental condition measurement in the two or more environmental condition measurements is outside an environmental condition requirement for a ground segment of the electronic shipping itinerary by comparing the second environmental condition measurement to the environmental condition requirement;

in response to the determining, issuing an action alert at the handler system, the action alert comprising the second environmental condition measurement;

receiving a carrier acceptance confirmation from the auxiliary computing device that indicates a transfer of the package to an aircraft, wherein the tracking device ceases transmissions in response to a change in pressure caused by a take-off of the aircraft and resumes transmissions in response to a second change in pressure caused by a landing of the aircraft;

receiving a departure confirmation for the flight segment pushed from the flight tracking system to the handler system; and displaying the departure confirmation for the package in a graphical user interface as a graphical change to displayed status information for the package.

16. The non-transitory computer-readable device of claim 15, wherein the environmental sensor measures temperature, humidity, oxygen content, atmospheric pressure, acceleration, speed, or light intensity.

17. The non-transitory computer-readable device of claim 15, wherein the environmental sensor has a first configurable measurement rate, and wherein the tracking device comprises a second environmental sensor having a second configurable measurement rate.

18. The non-transitory computer-readable device of claim 17, the operations further comprising:

transmitting a command message to the tracking device to cause the tracking device to change the first configurable measurement rate to modify a remaining battery life.

19. The non-transitory computer-readable device of claim 15, wherein the status message further comprises a tracking device identifier, a location of the tracking device, a remaining battery life, and a timestamp.

20. The non-transitory computer-readable device of claim 15, the operations further comprising:

transmitting a command message to the tracking device to cause the tracking device to stop transmitting to the handler system and start transmitting to a warehouse system.

* * * * *